United States Patent [19]
Chaney et al.

[11] Patent Number: 5,374,824
[45] Date of Patent: Dec. 20, 1994

[54] METHOD AND APPARATUS FOR DETERMINING AND UTILIZING CROSS-TALK ADJUSTED SCINTILLATING FIBERS

[75] Inventors: Roy C. Chaney, Plano; Hilton Hammack, Allen; Ervin J. Fenyves, Dallas; Pietro P. Antich, Richardson, all of Tex.

[73] Assignee: Board of Regents, The University of Texas System, Austin, Tex.

[21] Appl. No.: 177,743

[22] Filed: Jan. 5, 1994

[51] Int. Cl.$^5$ .................................................. G01T 1/20
[52] U.S. Cl. .............................. 250/363.02; 250/366; 250/367; 250/368; 385/116
[58] Field of Search ........... 250/366, 367, 368, 363.02; 385/115, 116, 120

[56] References Cited

U.S. PATENT DOCUMENTS

| | | |
|---|---|---|
| 3,978,337 | 8/1976 | Nickles et al. |
| 4,677,299 | 6/1987 | Wong |
| 4,739,168 | 4/1988 | Aoki |
| 4,749,863 | 6/1988 | Casey et al. |
| 4,823,016 | 4/1989 | Yamashita et al. |
| 4,829,185 | 5/1989 | Cerff |

(List continued on next page.)

FOREIGN PATENT DOCUMENTS

| | | |
|---|---|---|
| 377825A2 | 7/1990 | European Pat. Off. |
| 57-76466 | 5/1982 | Japan |
| 60-159675 | 8/1985 | Japan |
| 2198620A | 6/1988 | United Kingdom |
| 85/04959 | 11/1985 | WIPO |

OTHER PUBLICATIONS

Andreasen, "Brain Imaging: Applications in Psychiatry," Science, vol. 239, pp. 1381-1388, Mar. 18, 1988.
Atac, et al., "High Resolution Gamma-Ray Telescopes and Medical Imagers Using Scintillating Fibers and Position Sensitive Photomultipliers," SPIE vol. 1161, New Methods in Microscopy an Low Light Imaging, pp. 178-188, 1989.
Atac, et al., "High Resolution Gamma Ray Telescope Using Scintillating Fibers and Position Sensitive Photomultipliers," Nuclear Physics B, pp. 139-142, 1989.
Atac et al., "A High Resolution Scintillating Fiber Gamma-Ray Telescope," Proc. First International Symposium on the Super Collider, pp. 699-707, Feb., 1989.
Blumenfeld et al., "Plastic Fibers in High Energy Physics," Nucl. Inst. and Meth. in Phys. Res., A 257, 603-606, 1987.

(List continued on next page.)

*Primary Examiner*—Paul M. Dzierzynski
*Assistant Examiner*—Drew A. Dunn
*Attorney, Agent, or Firm*—Arnold, White & Durkee

[57] ABSTRACT

An apparatus and method for determining the level of cross-talk between scintillating fibers and the secondary attenuation length corresponding to a desired level of cross-talk and for utilizing cross-talk adjusted scintillating fibers in a medical imaging system is provided by the present invention. An input device receives a secondary attenuation length, which is then stored by a memory device. A central processing unit determines a level of cross-talk between scintillating fibers by calculating an average number of visible light photons produced within the fibers due to simulated interaction of an energized particle within the fibers. An output device displays the level of cross-talk. The central processing unit may also determine a plurality of levels of cross-talk for a plurality of secondary attenuation lengths and select a desired secondary attenuation length corresponding to a desired level of cross-talk. Also provided are cross-talk adjusted scintillating fibers, which include a scintillating fiber, a primary dye, and a secondary dye distributed within the fiber to produce the desired level of photon cross-talk. Utilization of cross-talk adjusted scintillating fibers in medical imaging systems is also contemplated.

18 Claims, 8 Drawing Sheets

U.S. PATENT DOCUMENTS

| | | |
|---|---|---|
| 4,870,279 | 9/1989 | Cuemas et al. ............... 250/367 |
| 4,942,302 | 7/1990 | Koechner . |
| 4,973,845 | 11/1990 | Mastrippolito et al. . |
| 5,103,098 | 4/1992 | Fenyves ........................ 250/368 |
| 5,281,821 | 1/1994 | Antich et al. ................. 250/367 |

OTHER PUBLICATIONS

Bower, "Images of Obsession," Science News, vol. 131, pp. 236–237, Apr. 11, 1987.

Brownell et al., "Positron Tomography and Nuclear Magnetic Resonance Imaging," Science, vol. 215, pp. 619–626, Feb. 5, 1982.

Buchsbaum et al., "Functional and Anatomical Brain Imaging: Impact on Schizophrenia Research," Schizophrenia Bulletin, vol. 13, No. 1, pp. 115–132, 1987.

Chaney, "Monte Carlo Simulation of Gamma Ray Detectors Using Scintillation Fibers", SPIE vol. 1159 EUV, X-Ray, and Gamma-Ray Instrumentation for Astronomy and Atomic Physics, pp. 18–26, 1989.

Chaney et al., "Simulation of Scintillating Fiber Gamma Ray Detectors for Medical Imaging," IEEE 1990 Nuclear Science Symposium, Arlington, Virginia, Oct. 22–27, 1990.

Fenyves, "Space-Based High Resolution Gamma-Ray Telescope," SPIE vol. 879 Sensing, Discrimination, & Signal Processing & Superconducting Materials & Instrumentation, pp. 29–36, 1988.

Hawkes, "Decay Time and Light Yield Measurements for Plastic Scintillating Fibbers," Nuc. Instrum. Meth., A292, pp. 329–336 (1990).

Lancaster et al., "Computers, Physics, and Medicine: Imaging the Body," Computers in Physics, pp. 16–22, Sep.–Oct., 1988.

Langham, "PET Scanning, Earlier and Better Pictures of Disease," Texas Times, pp. 42–25, Winter, 1985.

Petroff et al., "High Energy Particle Tracking Using Scintillating Fibers and Solid State Photomultipliers," IEEE Transactions on Nuclear Science, vol. 36, No. 1, pp. 163–164, Feb., 1989.

Rebourgeard, P., "A Simple Method for Measuring the Performance of Plastic Scintillating Materials," IEEE Trans. Nuc. Sci. V366-1, pp. 150–157, Feb., 1989.

Salamon, "Fiber Scintillators Coupled to a Multianode Photomultiplier as a High Rate Tracking Detector," IEEE Trans. Nuc. Sci. V34-1, pp. 525–527, Feb. 1987.

Spencer, "Theory of Electron Penetration," 98 Phys. Rev. pp. 1597–1615 Jun. 1955.

Uchida, et al., "Design of a Mosaic BGO Detector System for Positron CT," IEEE Transactions on Nuclear Science, vol. 33, No. 1, pp. 464–467, Feb., 1986.

"Proceedings of the Workshop on Scintillating Fiber Detector Development for the SSC," Fermi National Laboratory, Batavia, Ill., pp. v–viii, 55–138, Nov. 12–16, 1988.

METHOD AND APPARATUS FOR DETERMINING AND UTILIZING CROSS-TALK ADJUSTED SCINTILLATING FIBERS

NOTICE OF COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to imaging of gamma ray sources using scintillating fibers. In particular, the present invention relates to a device and method for determining and utilizing cross-talk adjusted scintillating fibers.

2. Background

Recent advances in diagnostic imaging, such as magnetic resonance imaging (MRI), computerized tomography (CT), single photon emission computerized tomography (SPECT), and positron emission tomography (PET) have made a significant impact in cardiology, neurology, oncology, and radiology. Although these diagnostic methods employ different techniques and yield different types of anatomic and functional information, this information is often complementary in the diagnostic process.

More particularly, the present invention generally relates to scintillating fibers used in PET and SPECT systems. Generally speaking, both PET and SPECT involve the detection of gamma ray photons. They differ in the source and energy of these photons. In the case of SPECT, the photons are directly generated by radioactive isotopes while in the case of PET, the photons are generated during the annihilation of positrons emitted by the radioactive isotopes. These radiotracers or radio pharmaceuticals typically are synthesized from labeled precursors and are inhaled or injected into the patient.

Typical scanners or tomographs include banks of large numbers of scintillating detectors surrounding the patient and are coupled to computerized data acquisition systems. The images of the temporal and spatial distributions of the inhaled or injected radio pharmaceuticals are reconstructed by using mathematical imagery construction tomography. They can provide unique functional information on blood flow and metabolism not easily obtainable by other technologies. In the case of PET, the short half-lives of the isotopes used, make it more convenient to produce them in an on-site cyclotron or other type of particle accelerator. A more recently developed PET system, as disclosed in U.S. Pat. No. 5,103,098 to Fenyves et al., allows the use of longer-lived isotopes that do not require on-site generation. U.S Pat. No. 5,103,098, issued on Apr. 7, 1992, is hereby incorporated by reference in its entirety.

Plastic scintillating fibers have become widely used in particle physics experiments. Commercial versions of these scintillating fibers are generally produced using polystyrene doped with a primary dye and with a secondary dye. Particles generated outside of the fiber travel through these fibers and deposit energy within the fiber that is converted by the fiber into light that can be detected. Scintillating fibers may be used in medical imaging systems where gamma rays interact with the fibers to generate these particles internally within the fiber.

In general, the process by which the particle energy is partially converted into light by scintillating fibers is the same for particle physics and medical imaging and takes three steps. First, the particle deposits energy into the scintillating fiber as it travels along its track. Second, the primary die absorbs part of this energy and emits it as ultraviolet light photons. Finally, the secondary dye absorbs energy from the ultraviolet light photons and emits it as visible light photons that travel down the fiber to be detected.

The distance over which the primary dye and secondary dye absorb energy is described by a primary and a secondary attenuation length. Attenuation length refers to the distance over which the energy flux intensity is reduced by 1/e and is dependent upon the concentration of dye in the scintillating fiber. The primary attenuation length is usually very small compared to the secondary attenuation length. The critical attenuation length for determining where visible light is generated, therefore, is the attenuation length for the absorption of ultraviolet light by the secondary dye. The smaller the secondary attenuation length, the smaller the volume where the ultraviolet light is absorbed and emitted as visible light. In most applications this volume is made as small as possible to prevent visible light from being generated in fibers adjacent to the one containing the primary event. The primary event is the location of the primary energy deposition of the particle to be detected.

Although a prior system utilizing liquid filled glass tubes recognized that communication between an X layer and a Y layer may be helpful, recent work in scintillating fiber research has been in the area of minimizing the secondary attenuation length to reduce communication between fiber layers. This effort has been fueled by the desire to improve the resolution of systems using scintillating fibers, which is determined by the ability to pin-point the location of the primary event. The accuracy of this measurement depends upon the diameter of the scintillating fibers used in the system (larger diameters reduce communication) and the amount of light produced in neighboring fiber layers (indicative of "cross-talk").

"Cross-talk" occurs when visible light is produced in fibers adjacent to the fiber containing the primary event. Cross-talk has recently been dealt with as creating uncertainty as to the location of the primary event. This uncertainty effectively reduces the resolution of the system. Thus, recent scintillating fiber research has sought to eliminate cross-talk by creating a fiber in which a significant portion of ultraviolet light emitted by the primary dye is absorbed within the same fiber in which it is produced. Creating such a fiber is accomplished by reducing the secondary attenuation length as much as possible.

The secondary attenuation length is a direct function of the concentration of secondary dye in the scintillating fiber. Fiber manufacturers can now produce a scintillating fiber with a secondary attenuation length as low as 10 microns by manipulating the concentration of secondary dye in the fiber. However, as mentioned above, the primary effort in the field has been to reduce the attenuation length to its minimum value in order to remove problematic cross-talk.

One of the challenges of detector systems is to provide the exact position of the energy deposition within the detector. A single fiber can produce two of the three coordinates necessary for position determination, but does not provide its location along the length of the fiber. In particle physics experiments, where the energy of the incoming particle is high, this is not a problem, since the particle will traverse several fibers. One can thus obtain the third position information from layers of multiple fibers which are angularly displaced relative to each other, for example, an XY fiber system. The detection of the particle in two adjacent layers, produces an accurate three dimensional position measurement.

In medical imaging systems, however, the particle energy is often so low that there is very little probability that the particle will travel enough distance to deposit energy into two different fiber layers. The shortened attenuation lengths for the secondary dyes found in commercial fibers today have greatly reduced the possibility of energy deposited by a particle in one fiber producing visible light in an adjacent fiber. This has led to the perception that scintillating fibers would not be useful as SPECT and PET detectors.

What is needed, therefore, is a device or method that would allow and take advantage of visible light produced in adjacent scintillating fiber layers used in a medical imaging system, without adversely affecting the resolution or efficiency of the system.

SUMMARY OF THE INVENTION

The present invention provides a device and method for determining and utilizing cross-talk adjusted scintillating fibers. The present invention largely solves the problems of using scintillating fibers as detectors in medical imaging systems utilizing angularly displaced fiber layers. As mentioned above, fibers recently have been developed primarily to eliminate cross-talk in order to increase resolution. The present invention recognizes, determines, selects, and optimizes cross-talk between scintillating fibers. Thus, this invention significantly increases the collection efficiency of XY stack devices, because it greatly increases the probability of light being generated within both an X layer and a Y layer.

The present invention recognizes the value of cross-talk between scintillating fibers, which occurs when visible light photons are produced in a scintillating fiber that does not contain the primary event. Cross-talk occurs when ultra-violet light photons are produced in a primary fiber, travel into an adjacent fiber, and are absorbed by the secondary dye, producing visible light photons in the adjacent fiber. This cross-talk is "photon" cross-talk. Cross-talk also occurs when the Compton electron produced by an energized particle (e.g. gamma ray) travels into an adjacent scintillating fiber and produces visible light. This second mode of cross-talk is "electron" cross-talk. Although it was known that communication between fiber layers may be valuable in imaging systems, it was not known how to select, enhance, or optimize cross-talk in scintillating fibers.

The present invention allows adjustment of the secondary attenuation length of a scintillating fiber to produce desirable cross-talk between adjacent fibers while keeping sufficient visible light production in the primary fiber. The secondary attenuation length is directly related to the concentration of the secondary dye in the scintillating fiber. A reduction of this concentration will increase the attenuation length and increase the fraction of ultraviolet light generated in the fiber containing the primary event that becomes absorbed in adjacent fibers. This increase in absorption by adjacent fibers will increase cross-talk between adjacent fibers.

By allowing for cross-talk to be adjusted, the present invention allows the primary event to create visible light in both the primary fiber and adjacent fibers even though the track of an electron is completely contained within a single fiber. A medical imaging system utilizing cross-talk adjusted scintillating fibers according to the present invention experiences a significant increase in the number of primary events within one fiber that produce visible light in an adjacent fiber, as is desirable for systems utilizing angularly displaced fiber layers.

An embodiment of the present invention is a method for determining a level of cross-talk between scintillating fibers including selecting secondary attenuation lengths, simulating the interaction of an energized particle (e.g. gamma ray) with the scintillating fibers, and determining the level of cross-talk by calculating the average number of visible light photons produced within the fibers. In another embodiment, the scintillating fibers have the same secondary attenuation length.

Another embodiment of the present invention is a method for determining a desired secondary attenuation length corresponding to a desired level of cross-talk including selecting a secondary attenuation length, simulating the interaction of an energized particle with the scintillating fibers, determining the level of cross-talk by calculating the average number of visible light photons produced within the fibers, repeating the above steps to produce a plurality of cross-talk levels, and selecting a desired attenuation length corresponding to a desired level of cross-talk.

In one embodiment, the selecting step comprises selecting an optimal secondary attenuation length corresponding to an optimal level of cross-talk. In another embodiment, the plurality of fibers are disposed in a plurality of layers, which are one fiber thick, angularly displaced and substantially parallel with respect to each other, and the determining step includes calculating the average number of visible light photons produced in the plurality of fibers. In a further embodiment, the layers are displaced by an angle of 90 degrees, and the determining step includes calculating the average number of visible light photons produced within the primary and the eight adjacent fibers.

An embodiment of the present invention is an apparatus for determining cross-talk between scintillating fibers including an input device for receiving secondary attenuation lengths, a memory device for storing the secondary attenuation lengths, a central processing unit for determining average visible light produced in a primary and an adjacent fibers, and an output device for displaying an indication of the level of cross-talk. In another embodiment, the scintillating fibers have the same secondary attenuation length.

In one embodiment, the central processing unit also determines a plurality of cross-talk levels and selects a desired secondary attenuation length corresponding to a desired level of cross-talk. In a further embodiment, the desired secondary attenuation length corresponds to an optimal level of cross-talk.

Another embodiment is a cross-talk adjusted scintillating fiber including a scintillating fiber having a primary dye distributed within the fiber and a secondary dye distributed within the fiber at a concentration to produce a desired level of cross-talk. In one embodiment, the secondary dye is distributed within the fiber to produce an optimal level of cross-talk.

A further embodiment of the present invention is a device for detecting a gamma ray in a diagnostic imaging system comprising a plurality of cross-talk adjusted scintillating fibers, positioned to receive gamma rays from gamma sources within a patient to be imaged, including at least one stack of scintillating fibers, and a plurality of position sensitive photomultipliers coupled to the scintillating fibers. The stack of scintillating fibers is comprised of a plurality of layers of scintillating fibers wherein each of the layers is one fiber diameter in depth, is positioned parallel with each adjacent layer, and includes a plurality of scintillating fibers positioned substantially parallel and immediate to each adjacent fiber within the same layer. Each of the plurality of layers is positioned at an angle to each adjacent layer. In one embodiment, the angle is 90 degrees.

The collecting and processing system of the present invention preferably comprises the outputs from each photomultiplier connected to the inputs of fast analog-to-digital converters, the outputs of the analog-to-digital converters connected to at least one processor, and the processor enabling storage and display of a form of the data. The form of the data stored or displayed may be either processed or raw data. Further, collecting and processing system enables determination of the spatial coordinates, i.e. the x-y-z coordinates, of the position of the detected gamma ray.

The method of the present invention for detecting gamma rays in a diagnostic imaging system comprises the steps of configuring a plurality of cross-talk adjusted scintillating fibers proximate to a gamma ray source, coupling a plurality of photomultipliers to the scintillating fibers, and collecting and processing data output from the photomultipliers to locate the gamma ray source. The scintillating fibers are positioned with the fibers substantially parallel and lengthwise to each other in each layer. Each layer is positioned parallel to each adjacent layer in a stack, with fibers in each layer being at an angle—the interlayer fiber angle—with respect to the fibers in each adjacent layer. In one embodiment, the interlayer fiber angle is 90 degrees. Each photomultiplier is coupled to at least one fiber and preferably to a plurality of fibers, and each fiber has at least one end coupled to one of the photomultipliers.

The step of collecting and processing data may comprise connecting an output from each photomultiplier to an input of a fast analog-to-digital converter and further connecting the output of each analog-to-digital converter to at least one processor, the processor enabling storage and display of a form of the data.

The present invention, therefore, provides a novel device and method for determining and utilizing cross-talk adjusted scintillating fibers. The foregoing features, and advantages of the present invention will be further appreciated from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof which is illustrated in the appended drawings, which drawings form a part of this specification.

It is to be noted, however, that the appended drawings illustrate only exemplary embodiments of the present invention and are, therefore, not to be considered limiting of its scope, for the invention may admit to other equally effective embodiments.

DETAILED DESCRIPTION

1. General Principles

The ideas presented in this patent are applicable to both PET and SPECT medical imaging systems. For the purpose of discussion, an application to a PET imaging system is described.

Figure 1:
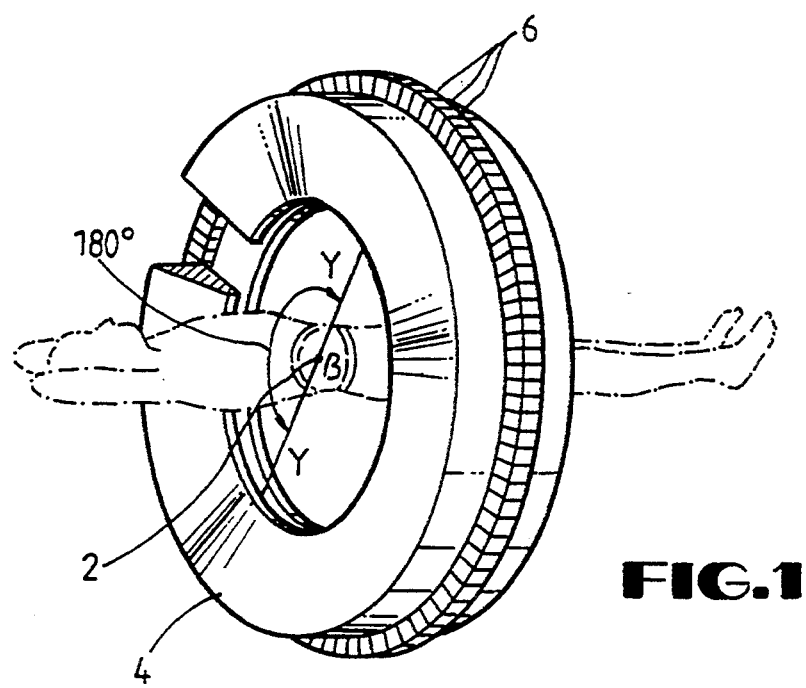
FIG. 1 is a perspective drawing of a ring of gamma ray detectors in accordance with the present invention in a PET configuration.

In positron emission tomography (PET) systems presently in use, radiotracers and radiopharmaceuticals are synthesized from labeled precursors and are inhaled or injected into a patient. PET scanners typically include banks of large numbers of detectors surrounding the patient coupled to computerized data acquisition systems. Referring to FIG. 1, the patient having received positron emitting gamma ray source 2 is positioned within support ring 4. In an embodiment of the present invention, scintillating fiber stacks 6 are positioned about the patient on support ring 4.

The radiotracer or radiopharmaceutical emits a positron which, after traveling a short distance from the nucleus, interacts with an electron. The resulting annihilation, yields two approximately 0.5 million electron volt (MeV) photons which are oppositely directed. In other words, the photons resulting from the pair annihilation fly off at 180° from one another.

Figure 1A:
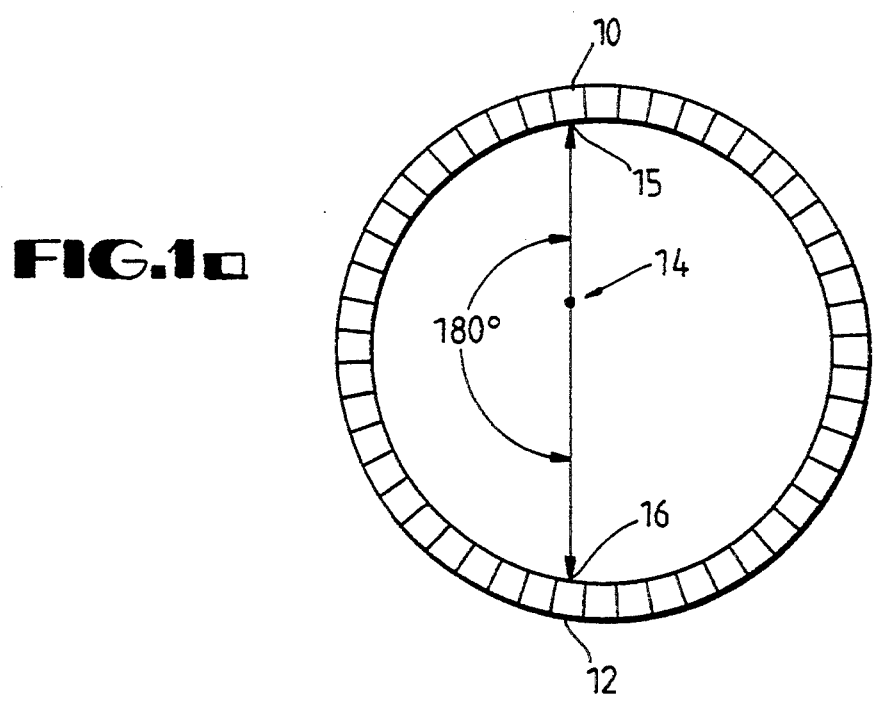
FIG. 1A illustrates a technique for locating an origination position of a gamma ray pair in the present invention in accordance with a PET detector.

FIG. 1A illustrates the spatial origination position of gamma ray 14, i.e., the position of the pair annihilation. The gamma ray photons, referred to as gamma's, resulting from annihilation fly off at 180° from each other. Gamma 15 strikes scintillating fiber stack 10 and gamma 16 strikes scintillating fiber stack 12. By determining the two points where the gamma's strike fiber stacks 10 and 12, one knows that the gamma source is along a line connecting the two points 10 and 12. Using this line source information for many different pair annihilation as detected by many different detectors in the ring, a data acquisition system can construct a three dimensional mapping of the number of gamma rays receive from a given position in the body. This of course is directly related to a mapping of the concentration of the radio-nuclide within the body In an embodiment, a coincidence measurement by photomultiplier tubes connected to detectors 10 and 12 enables, through a trigger signal, the collection of the coordinates for the two gamma's.

Figure 2:
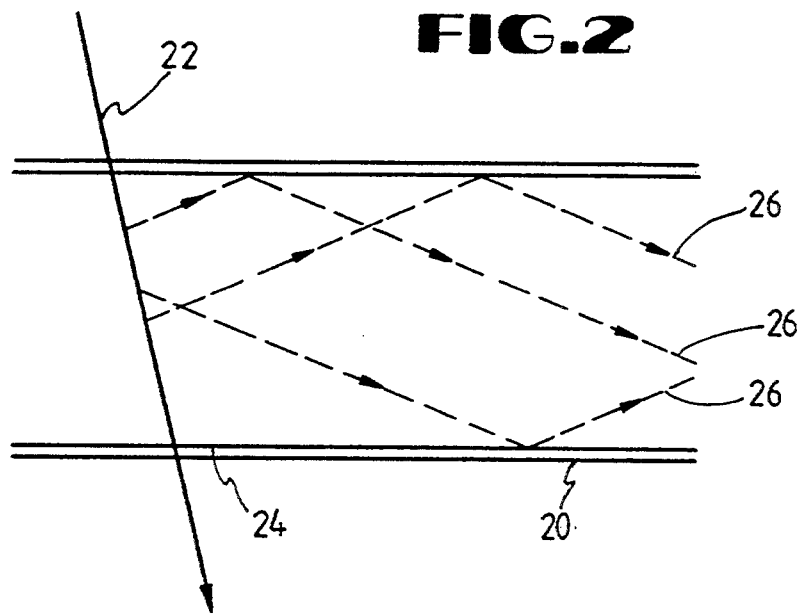
FIG. 2 illustrates an ionizing particle passing through a scintillating fiber of the present invention and producing photons in the scintillating fiber.

Referring to FIG. 2, a single scintillating fiber 20 is illustrated. As used throughout this application, the terms fiber and scintillating fiber refer to a scintillating fiber. Scintillating fibers are presently available, by way of example, from Bicron Corporation of Newbury Heights, Ohio, and Kuraray/Kyowa Gas Chemical Ltd, Japan.

When gamma rays pass through the fiber stack some of them interact with the atoms in the fiber to produce energetic electrons. These electrons are one of a class of ionizing particles which can produce light in a scintillating fiber. They are called ionizing particles because they ionize the atoms along their path. An ionizing particle 22, including but not limited to a secondary electron generated by gamma rays, is generate within or enters scintillating fiber 20 and may pass completely through scintillating fiber 20. Visible light photons 26 are produced within scintillating fiber 20 from the energy deposited by ionizing particle 22. First, the fiber 20 absorbs energy from the ionizing particle 22. Second, the primary dye in turn absorbs the energy absorbed by the fiber 20 and emits ultraviolet photons. Finally, the secondary dye in turn absorbs ultraviolet photons and emits visible light photons 26.

For example, scintillating fiber 20 may comprise polystyrene doped with butyl-PBD (phenyl-biphenyl-oxadiazole), as the primary dye, and POPOP (diphenyloxazolyl-benzene), as the secondary dye, producing 420 nanometer wavelength photons. In addition, the fiber is preferably of the dimensions 0.5 mm×0.5 mm and clad in PMMA (polymethylmetacrylate) to help reflect visible light photons produced in a fiber down the fiber to photon detectors. The attenuation length of the 420 nanometer photons as they travel down the fibers is sufficiently low to allow enough photons to strike photon detectors coupled to at least one end of the fiber for an acceptable detection signal to be generated.

2. Determination of the Level of Cross-talk

Figure 5:
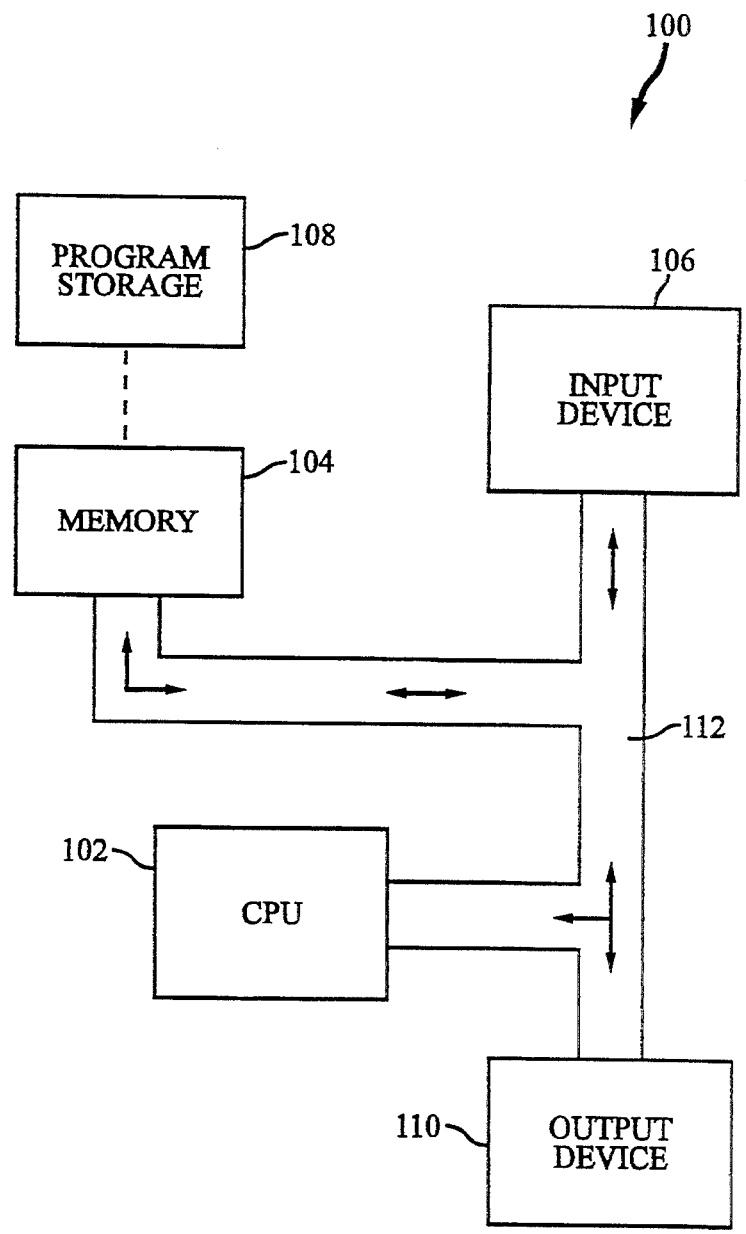
FIG. 5 is a block diagram of an apparatus for determining cross-talk between scintillating fibers corresponding to secondary attenuation lengths according to the present invention.
Figure 6A:
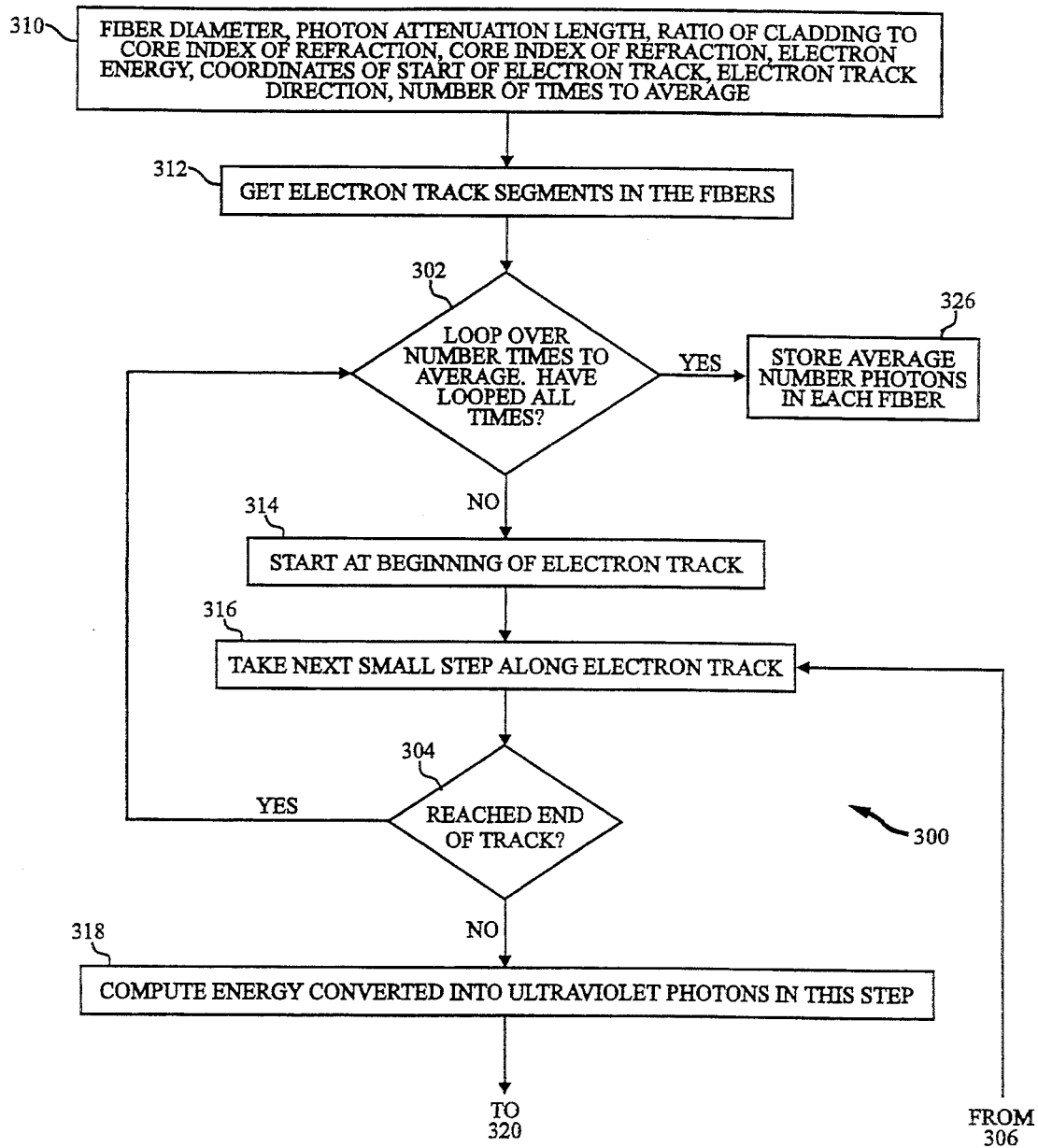
FIGS. 6A and 6B are a flow chart for determining cross-talk between scintillating fibers corresponding to a selected secondary attenuation length according to the present invention.
Figure 6B:
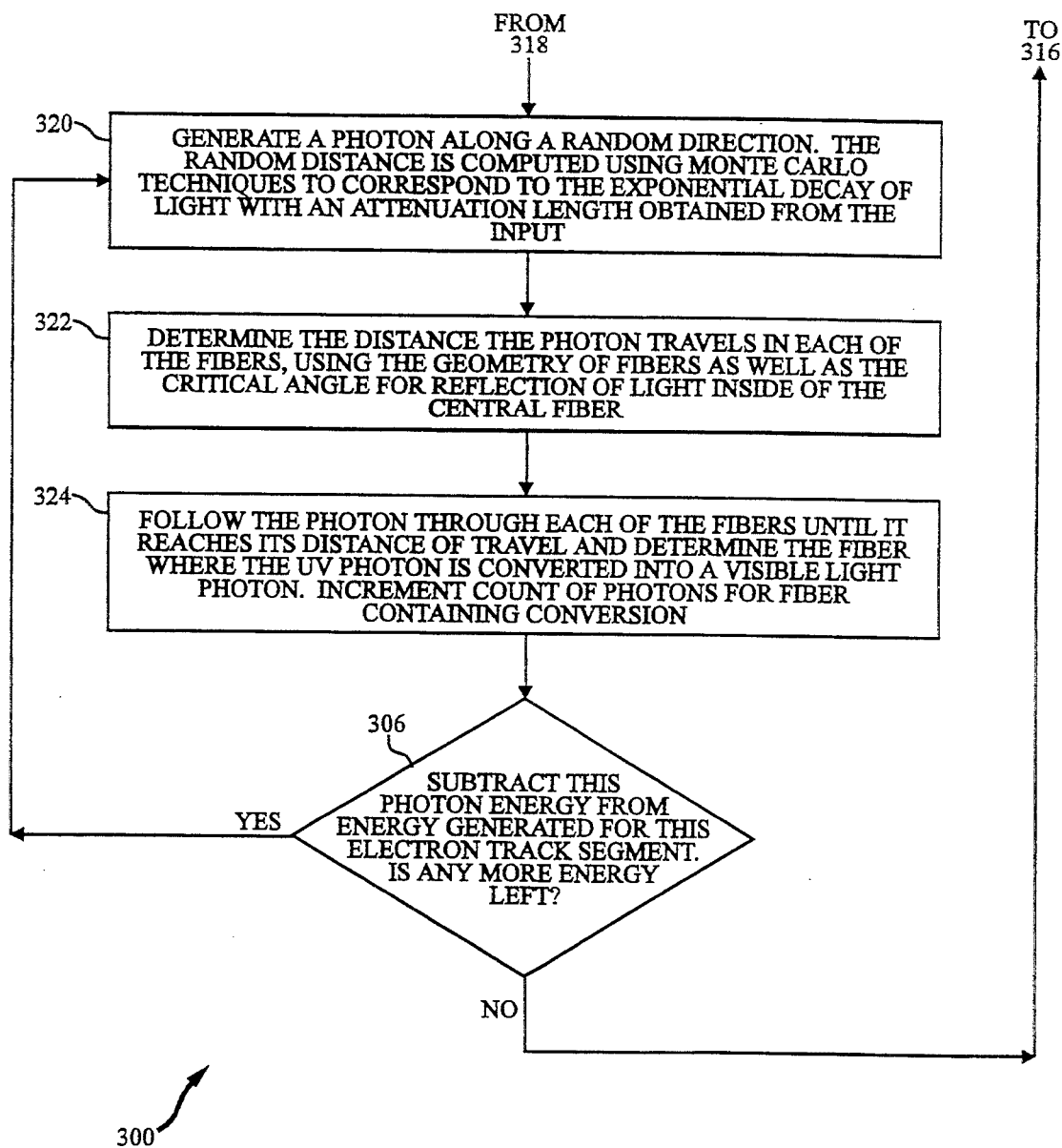

A computer system 100 according to the present invention for determining cross-talk between scintillating fibers is shown in FIG. 5. Cross-talk determination method 300 according to the present invention is described in the flow chart shown in FIGS. 6A and 6B. Computer system 100 includes central processing unit 102, an input device 106, a program storage medium 108, a memory device 104, an output device 110, and a data/address bus 112. Central processing unit 102 is connected to memory 104, to input device 106, and to output device 110 through data/address bus 112. Determination method 300 includes three decisional blocks: 302, 304, and 306, and includes nine procedural blocks: 310, 312, 314, 316, 318, 320, 322, 324, and 326.

Computer system 100 first loads cross-talk determination method 300 of the present invention into memory 104 from program storage medium 108. The program listing, which is included at the end of this specification prior to the claims, implements this method, producing the average number of visible light photons produced in each fiber. The program is written in the C programming language and was developed on a personal computer.

Program storage medium 108 may be any machine readable storage medium such as a floppy or hard magnetic disk, an optical disk, or a programmable read-only memory. Computer system 100 may be a IBM personal computer. However, it will be understood that the particular hardware can be of other types. Acceptable alternatives include computer systems manufactured by, for example, Digital Equipment Corporation, International Business Machines, Sun Microsystems, or Hewlett-Packard. Versions of the program for other computer systems are readily producible by practitioners skilled in the art.

Once the determination method 300 of the present invention is loaded into memory 104, it is processed by central processing unit 102. Initially, in procedural block 310 central processing unit 102 receives data from input device 106. Input data includes physical parameters of the simulated scintillating fibers and of the simulated energized electron. Physical parameters of the fiber include fiber diameter, initial secondary attenuation length, index of refraction of the core, and ratio of cladding to core index of refraction. Physical parameters of the energized electron include average electron energy, starting location of the electron track, and direction of the electron track. Average electron energy is taken from Monte Carlo simulations of the Compton process, for example, as described in R. C. Chaney, E. Fenyves and P. P. Antich, "Simulation of Scintillating Fiber Gamma Ray Detectors for Medical Imaging," IEEE 1990 Nuclear Science Symposium (Arlington, Va., Oct. 22–27, 1990). This paper is incorporated by reference in its entirety. Another paper discussing the simulation of gamma ray interaction with scintillating fibers is R. C. Chaney, "Monte Carlo Simulation of Gamma Ray Detectors Using Scintillating Fibers," SPIE—The International Society for Optical Engineering, Vol. 1159, page 18 (1989). This paper is also incorporated by reference in its entirety.

Figure 8:
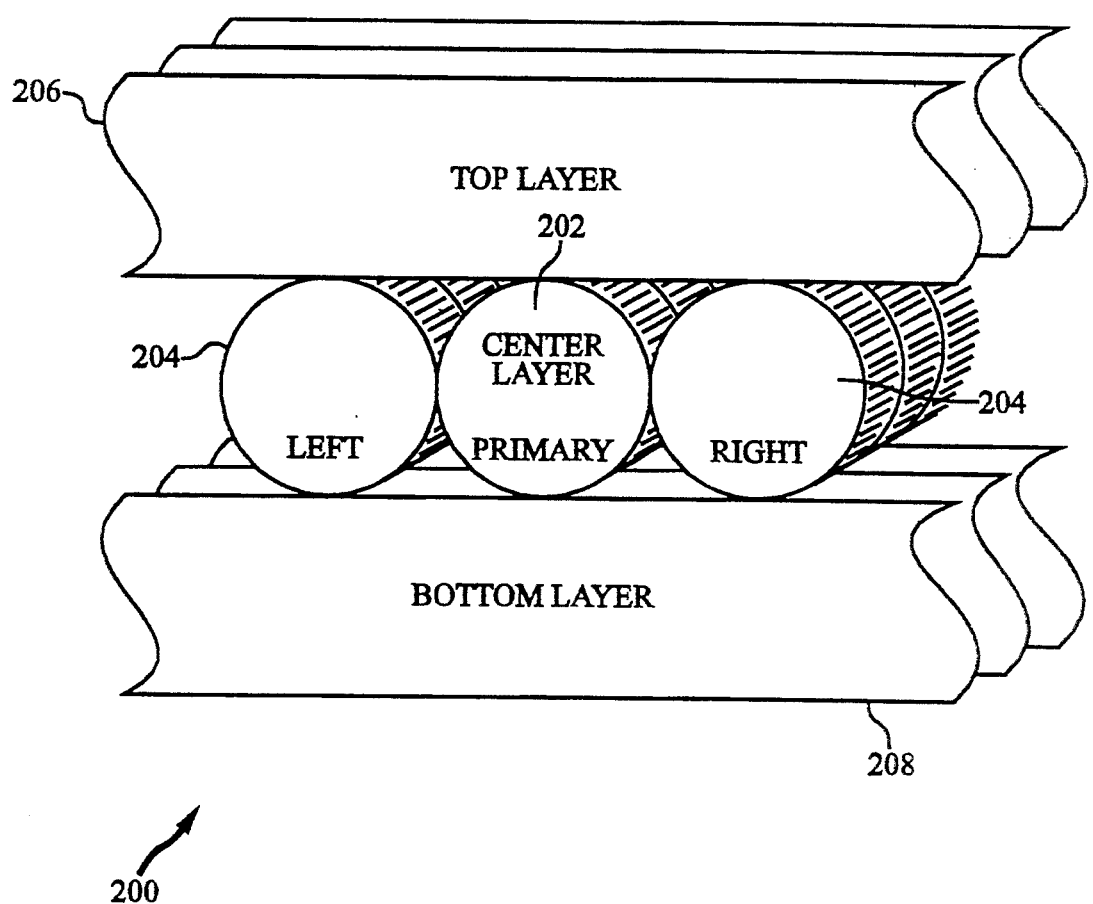
FIG. 8 is a schematic diagram of a central layer, a top layer, and a bottom layer, including a primary scintillating fiber and the eight scintillating fibers adjacent to the primary scintillating fiber.

In procedural block 312, the central processing unit 102 simulates a stack of scintillating fibers and sets up a reference frame which places the starting location for the electron track to be within the primary scintillating fiber. The eight closest adjacent scintillating fibers to this primary fiber are then determined. FIG. 8 shows the relevant scintillating fibers in fiber stack 200 according to the present invention. The relevant scintillating fibers are the primary fiber 202, the two adjacent fibers 204 that lie in the central layer with primary fiber 202, the three nearest adjacent fibers 206 in the top layer above primary fiber 202, and the three nearest adjacent fibers 208 in the bottom layer below primary fiber 208. The visible light photons produced in the top layer and the bottom layer is representative of the level of cross-talk produced in adjacent fiber layers.

It is understood to one of skill in the art that this determination method may be modified to include any number of adjacent fibers or to include relevant fibers that are not adjacent to the primary fiber. The only requirement for determining cross-talk is that there be a primary fiber and at least one other relevant fiber. It is also understood that the present invention may be modified to determine only the visible light photons produced in a single fiber without regard to light produced in any other fiber.

The determination method makes several assumptions in simulating the scintillating fibers. The fibers are assumed to be cylindrical. The fibers are placed in the stack so as to touch each other. The fibers have a central core which contains the scintillating dyes, covered by a cladding material of a thickness approximately 3% of the core diameter. The presence of the cladding provides a smooth surface which enhances the propagation of the visible light down the fiber. The cladding does not contain any secondary dye, and therefore does not absorb any ultraviolet photons as they pass through it. In principle, the area of the fiber which can absorb the ultraviolet photons is, therefore, reduced by the 3% associated with the cladding areas. This effect can be ignored due to relatively small size of the cladding compared to the diameter of the core. Reflections of the light at the surfaces of the fibers are governed by geometrical optics, using the index of refraction values for the fiber being considered. The fibers are also assumed to have the same attenuation lengths; however, it is understood that the fibers may have different attenuation lengths.

The scintillating fibers are also assumed to be oriented within an XY fiber stack. Because the geometrical arrangement of layers in a XY stack where the layers are oriented at 90 degrees is different from that for other angles of orientation for adjacent layers, this program would have to modified to account for these different configurations. These changes are, however, obvious to those skilled in the art. It is understood, therefore, that the fibers may be angularly displaced at various angles.

In addition, central processing unit 102 simulates gamma ray interaction with the scintillating fibers, including physical parameters of gamma ray interaction. The gamma ray emitted by the gamma ray source is assumed to produce a Compton event within the scintillating fiber stack. The resulting Compton electron is assumed to travel in a straight line track through the fiber stack, even though slight curvature will occur in an actual fiber stack due to collisions with other electrons in the medium. The effect of this curvature on the photon cross talk is assumed not to be significant. The length of the path for a given electron energy and the energy deposited by the electron per unit length of path may be taken from literature, for example, Spencer, "Theory of Electron Penetration," 98 Phys. Rev. 1597 (1955), which is incorporated by reference in its entirety.

Decisional block 302 determines whether the total number of loops to average results has been reached. Although an average typically would require at least two loops, it is understood that in the context of this determination method that the loop could only be done once. The average number of visible light photons produced for a single loop would, therefore, be only the single output of the number of visible light photons produced.

If the number of times to average has not been reached, procedural step 314 places the electron at the beginning of the electron track. Procedural block 316 moves the electron one step along the electron track. In decisional block 304, central processing unit 102 determines if=the end of the electron track has been reached. If not, central processing unit 102 in procedural step 318 determines the energy deposited by the electron and converted into ultraviolet photons in the short distance stepped along the direction of the electron track. The number of ultraviolet photons that are generated by the primary dye as a result of energy deposited by the electron is determined using the scintillating efficiency of the primary dye. This efficiency represents the effectiveness of the transfer of energy from the electron to the optical photon and is a parameter which may be obtained from the fiber manufacture.

In procedural block 320, central processing unit 102, simulates the generation of one ultraviolet photon along a random direction. A random travel distance is determined for the ultraviolet photon using Monte Carlo techniques and the secondary attenuation length. Combining the direction and the travel distance, a path for the photon is determined.

In procedural blocks 322 and 324, central processing unit 102 determines what happens to the generated ultraviolet photon. As the photon travels through the primary fiber, one of three things can happen. First, the photon can be converted by the secondary dye into visible light in the primary fiber, if the path distance within the primary fiber is greater than the photon distance. Second, the photon can be reflected at the walls of the primary fiber and remain in the primary fiber until it is converted by the secondary dye into visible light. The critical angle for reflection is based upon the index of refraction of the cladding to core relative to the outside air (assumed to be one). Third, the photon can exit the primary fiber and move to adjacent fibers.

Of these three possibilities, only the third will lead to cross-talk between the primary fiber 202 and adjacent fibers 204, 206, and 208. Both the first and second possibilities result in a logging of the photon energy as being deposited in primary fiber 202. If the third possibility occurs, the photon is followed as it traverses the appropriate adjacent fiber of the eight adjacent fibers 204, 206, or 208. Once the photon distance is exhausted by traversing one or more fibers, the fiber containing the end of the photon track is logged as receiving the photon energy and producing visible light.

If the photon track is longer than the distances of the eight adjacent fibers 204, 206, and 208, it is considered lost and is not logged. The number of photons which do not convert in primary fiber 202 or eight adjacent fibers 204, 206, or 208, may be determined for purposes of establishing the collection efficiency.

In decisional block 306 central processing unit 102 subtracts the photon energy from the total energy to determine if all of the ultraviolet photons produced during the step along the electron segment have been analyzed. If not, procedural blocks 320, 322, and 324 are repeated. Once all of the ultraviolet photons have been processed, control passes back to procedural block 316, where the electron is moved along the electron track.

The fibers receiving converted photons are logged as the electron steps along the electron track. If the Compton electron moves outside of primary fiber 202 before reaching the end of the electron track, the Compton electron is assumed to travel undisturbed until it reaches another fiber. The electron track is then followed into the appropriate adjacent fiber to produce new ultraviolet photons. The visible light photons produced for these new ultraviolet photons represents electron crosstalk.

Upon completion of the electron track, central processing unit 102 stores output data, including the total number of photons generated, number of photon conversions in primary fiber 202, the number of conversions in eight adjacent fibers 204, 206, and 208, and the percentage of photons in each of the fibers. The number of visible light photons produced will usually be dominated by photon cross-talk rather than electron cross-talk because the electron path is generally short compared to the fiber diameter.

Decisional block 304 then transfers control to decisional block 302. Central processing unit 102 repeats the procedure for a pre-determined number of times for the given secondary attenuation length. A satisfactory number of times to repeat for statistical purposes is on the order of 30 times, although a greater or fewer number of times would be acceptable. Once completed, central processing unit 102 in procedural block 326 determines an average visible light in each of the nine fibers. The visible light produced in the top layer fibers and the bottom layer fibers corresponds to the level of desirable cross-talk between the adjacent layers. Central processing unit then utilizes output device 106 to display an indication of the level of cross-talk.

EXAMPLE I

An example utilizing cross-talk determination method 300 as embodied in the attached listing, will now be described. The information below represents typical input data representative of physical parameters that is provided to cross-talk determination method 300.

Looking to FIG. 8, the coordinate system is oriented so that the z axis points out of the paper, the y axis points up, and the x axis points to the right. The input corresponds to a stack of 0.5 mm diameter fibers with a fiber secondary attenuation length of 0.6 mm. The fibers have a core index of refraction of 1.59 and a clad index of 1.41. This gives a ratio of clad to core index of refraction of 1.41/1.59=0.887. The initial energy of the electron is input at 175 keV and initial position is at the center of the primary fiber (x=0, y=0, z=0). The electron is moved in a direction along the z axis (Out of the page in FIG. 8) which corresponds to a polar coordinate theta of 0 degrees and a phi value which does not matter, but is set to 0 degrees. The number of times to average is set to 30.

Cross-talk determination method 300 provided an averaged output of the total number of ultraviolet photons produced by the primary dye and of the total number of these photons which were converted into visible light photons in all of the fibers pictured in FIG. 8. These numbers were 1454 and 1228, respectively. The average number of visible light photons produced in the top layer fibers were: 40 (front fiber), 89 (middle fiber), 5 (back fiber). The average number of visible light photons produced in the bottom layer fibers were: 39 (front fiber), 89 (middle fiber), 3 (back fiber). The average number of visible light photons produced in the central layer fibers were: 47 (left fiber), 863 (primary fiber), 49 (right fiber).

Thus, the total visible light photons produced in the center layer is 961 and a total visible light photons produced in the top and bottom layers—the outside layers—is 267. The number of visible light photons that are trapped in the scintillating fibers and travel down the fibers to be detected may be determined from the collection efficiency of the fiber, which may be obtained from the fiber manufacturer. For this example, approximately 102 photons would be trapped in the central layers, and 28 photons would be trapped in the outside layers.

3. Determining Desired Secondary Attenuation Length Corresponding to a Desired Level of Cross-talk Determination method 300 may be repeated for a plurality of secondary attenuation lengths. An output may be obtained of the average number of visible light photons produced in the primary and adjacent scintillating fibers versus the plurality of secondary attenuation lengths. The present invention is, therefore, capable of allowing one to select a desired level of cross-talk and to determine what secondary dye concentration will produce that desired level of cross-talk.

Figure 9:
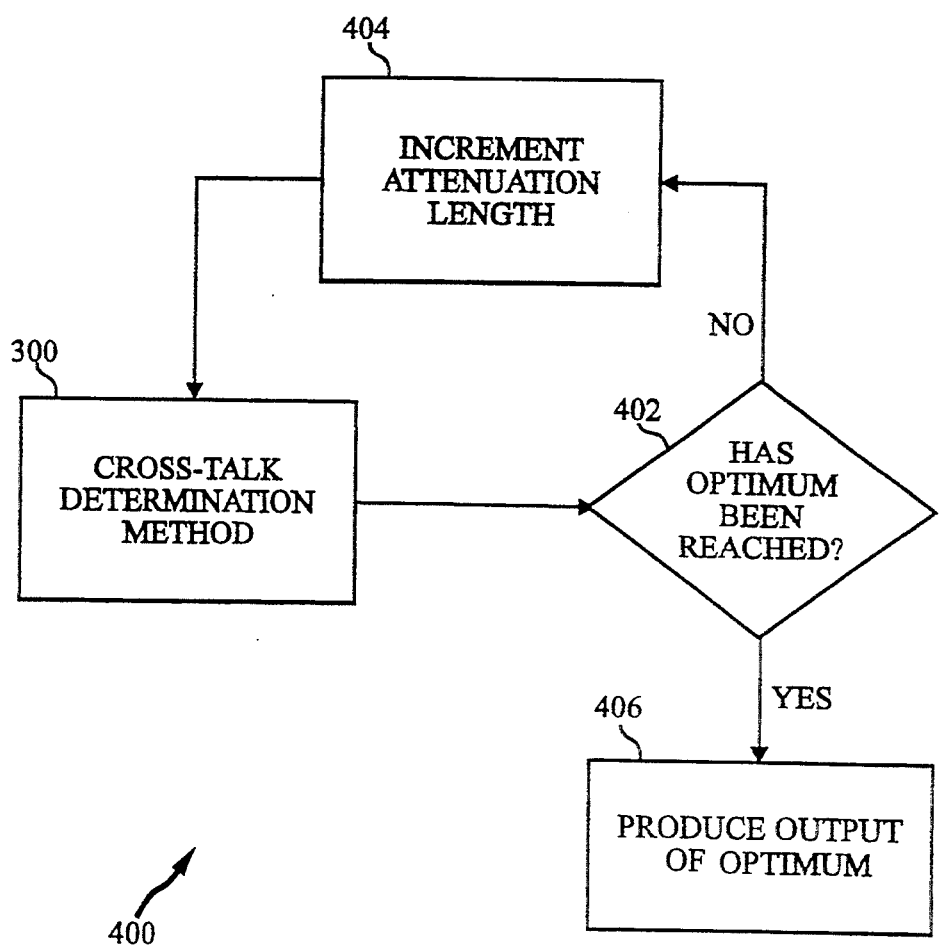
FIG. 9 is a flow chart for determining the optimum secondary attenuation length for cross-talk between scintillating fibers according to the present invention.

FIG. 9 shows optimization method 400 that provides the optimum secondary attenuation length if the desired level of cross-talk is an optimal level of cross-talk. In determining the optimum secondary attenuation length to achieve an optimal level of cross-talk, central processing unit 102 first processes cross-talk determination method 300 for a initial secondary attenuation length. In decisional block 402, central processing unit 102 compares the present set of averaged output data with the last set of averaged output data to determine if the optimal level of cross-talk has been reached. If the optimum has not been reached, central processing unit 102 increments the attenuation length and processes cross-talk determination method 300 again.

For each increase of the secondary attenuation length, the percentage of visible light produced in primary fiber 202 will decrease, and the percentage of visible light produced in adjacent fibers 204, 206, and 208 will generally increase. At some point, however, an increase in attenuation length does not result in an increase in the percentage of visible light produced in adjacent fibers 204, 206, and 208. At this point, the secondary attenuation length has been incremented too far, and the previous secondary attenuation length is the optimal secondary attenuation length. Once the optimal value has been reached, central processing unit 102 produces an output of the optimum secondary attenuation length, in procedural block 406.

EXAMPLE II

This example was conducted utilizing cross-talk optimization method 400. All of the parameters utilized in Example I are the same except for the secondary attenuation length, which is adjusted. The secondary attenuation length is placed in the left column of the table, the number of visible light photons produced in the central layer is in the middle column, followed by the number produced in the outside layers.

| Fiber Attenuation in mm | Photons in Central Layer | Photons in Outside Layers |
| --- | --- | --- |
| 0.1 | 1410 | 42 |
| 0.2 | 1284 | 149 |
| 0.3 | 1170 | 218 |
| 0.4 | 1086 | 248 |
| 0.5 | 1027 | 255 |
| 0.6 | 960 | 262 |
| 0.7 | 919 | 257 |
| 0.8 | 890 | 252 |
| 0.9 | 862 | 240 |
| 1.0 | 834 | 230 |

The optimization method 400 as described above provides that the optimal secondary attenuation length is around 600 microns to produce an optimal level of cross-talk. Above 600 microns, the number of photons produced in the outside layers decreases.

4. Cross-talk Adjusted Scintillating Fibers

A cross-talk adjusted scintillating fiber may be obtained by selecting a secondary attenuation length corresponding to a desired level of cross-talk and by manufacturing a fiber with this desired secondary attenuation length. Fiber manufactures are known to those skilled in the art to be capable of producing scintillating fibers to meet specifications. These specifications include the wavelength of desired visible light, the expected energy of the particle, and the attenuation length for the primary and secondary dye.

A cross-talk adjusted scintillating fiber for a given imaging application may be obtained by providing a fiber manufacturer with the desired secondary attenuation length. The conversion from the secondary attenuation length to the necessary secondary dye concentration may be made using empirical formulas well known to fiber manufacturers. It may also be tested on a given fiber material using a spectra-photometer. Scintillating fibers are presently available, by way of example, from Bicron Corporation of Newbury Heights, Ohio, and Kuraray/Kyowa Gas Chemical Ltd, Japan.

Papers discussing the production of scintillating fibers include: "Proceedings of the Workshop on Scintillating Fiber Detector Development for the SSC," Fermi National Laboratory, Batavia, Ill. Nov. 12–16 1988; Hawkes, C. M., "Decay Time and Light Yield Measurements for Plastic Scintillating Fibers," *Nuc. Instrum. Meth.*, A292 (1990), 329, 336; Rebourgeard, P., "A Simple Method for Measuring the Performance of Plastic Scintillating Materials," *IEEE Trans. Nuc. Sci.* V366-1, February, 1989, 150; and Salomon, M. Fiber, "Scintillators Coupled to a Multianode Photomultiplier as a High Rate Tracking Detector," *IEEE Trans. Nuc. Sci.* V34-1, February, 1987, 525. The disclosures of each of these articles are incorporated by reference.

5. Angularly Displaced Fiber Layers

The present invention is primarily effective in improving the efficiency of medical imaging systems utilizing scintillating fiber stacks with angularly displaced fiber layers and low energy incident particle or gamma rays. For example, the system utilizing angularly displaced fiber layers disclosed in U.S. Pat. No. 5,103,098 to Fenyves et al.

By allowing for cross-talk between fiber layers, the present invention increases the number of primary events that produce visible light in adjacent layers. Visible light production in adjacent layers is required by these systems in order to locate accurately the primary event. The present invention, therefore, increases the efficiency of these devices without significantly reducing the resolution.

Figure 3:
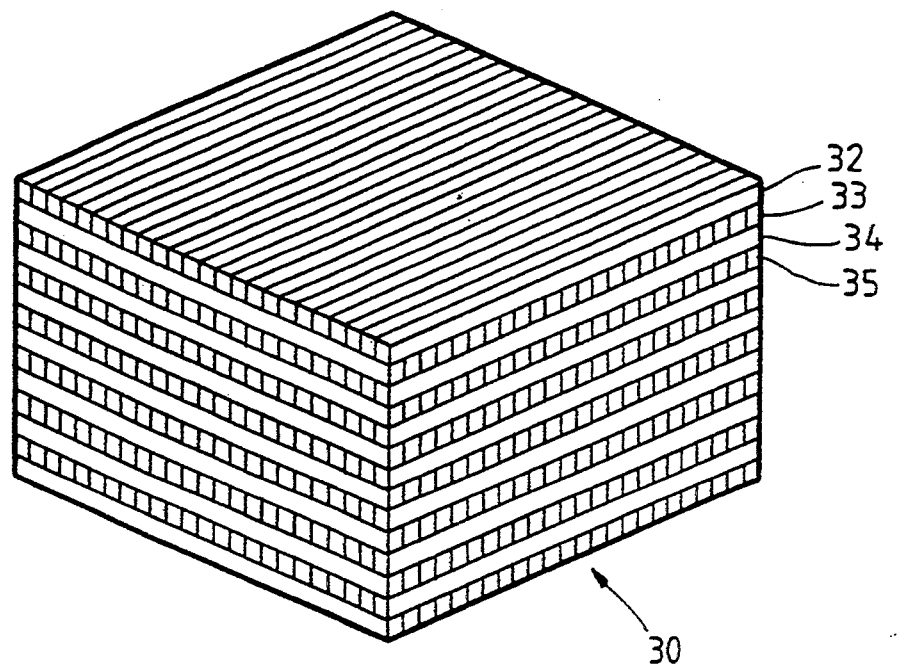
FIG. 3 is a perspective view of a stack of scintillating fibers in accordance with an embodiment of the present invention.

Referring to FIG. 3, a portion of fiber stack 30 is illustrated. Fiber layer 32 comprises lengths of scintillating fibers positioned lengthwise parallel to additional lengths of scintillating fibers and forming a layer of scintillating fibers preferably having a depth of the diameter of a single fiber. Fiber layers 32, 33, 34 and 35 are produced in this manner. In this preferred embodiment, the fibers comprising layer 32 are positioned at a 90° angle to the fibers comprising layer 33. Layers 32 and 33 are positioned adjacent to each other. Similarly, fibers of layer 34 are positioned at a 90° angle to the fibers of layer 33 and the fibers of layer 35 are positioned at a 90° to the fibers of layer 34. Layers 32, 33, 34 and 35 are positioned adjacent to each other. Additional layers are preferably added to the stack as shown in FIG. 3 wherein each layer has its respective fibers positioned at a 90° angle to the fibers of each adjacent layer.

Figure 4:
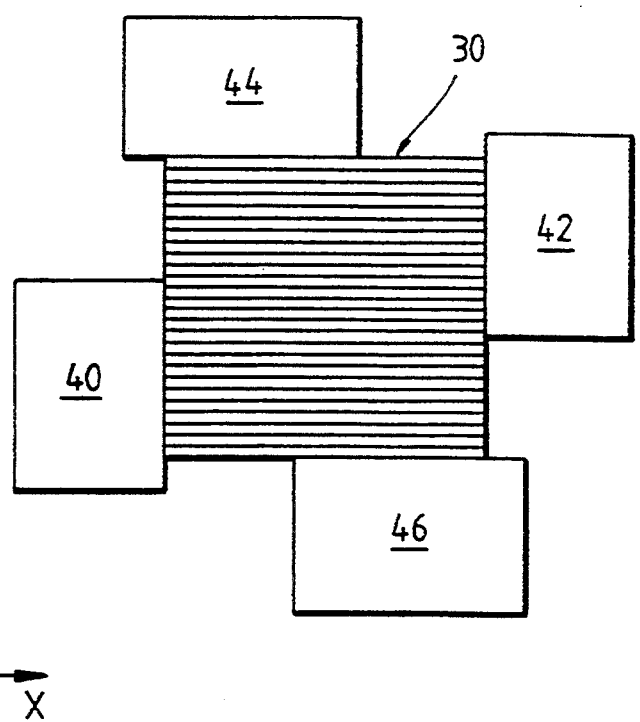
FIG. 4 is a top view of the stack of scintillating fibers of FIG. 3 coupled to photomultipliers in accordance with the present invention.

By way of example, FIG. 4 shows a top view of fiber stack 30 with photon detectors positioned about and coupled to fibers in fiber stack 30. In particular, each fiber in fiber stack 30 is coupled to at least one photon detector. In this embodiment, the photon detectors comprise position sensitive photomultiplier tubes 40, 42, 44, 46. Position sensitive photomultipliers are presently available, by way of example, from Hamamatsu of Japan as part of Hamamatsu's R2486 series.

At least one end of each fiber of fiber stack 30 is coupled to a photon detector. As shown in FIG. 4, photomultiplier tubes 40 and 42 are coupled to ends of fibers lengthwise positioned in the x direction. Photomultiplier tubes 44 and 46 are coupled to ends of lengthwise fibers positioned in the y direction. A single position sensitive photomultiplier may be coupled to multiple layers of fibers.

It is understood that the present invention may be modified to include fibers layers angularly displaced at various angles, e.g., at a 60 degree angle.

6. Data Acquisition System

Figure 7:
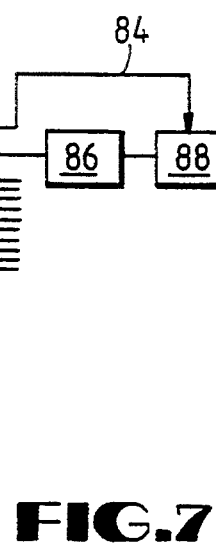
FIG. 7 is a schematic diagram of a system for collecting and processing data in accordance with the present invention.

Referring to FIG. 7, a typical data acquisition system connected to an output related to a position on the face of a position sensitive photomultiplier tube is shown. Position sensitive photomultiplier 82 is coupled to a plurality of layers of fiber within fiber stack 80 wherein the fibers in each layer coupled to photomultiplier 82 are essentially parallel. Amplifier 86 increases the signal output received directly from photomultiplier 82. Trigger 84 from photomultiplier 82 indicates to a fast analog-to-digital converter 88 that a photon has been detected by photomultiplier 82. Analog-to-digital converter 88 converts the analog output signal from the photomultiplier, corresponding to the photon detected, into a digital signal. Buffer 90 interconnects analog-to-digital converter 88 with processor 92. Other processors 94 from other output positions on photomultiplier 82 and other photomultipliers, as appropriate, are input to image processor 96. Data related to the photon detected is storable in data storage 98 or displayable on data display 100 or both. In this embodiment, the form of data stored in data storage 98 may be data already processed by image processor 96. However, raw data may be stored in an alternate data storage systems where the alternate data storage system is positioned prior to image processor 96 in the circuit shown.

In particular, the data acquisition system of the present invention constructs an image from the data collected by the scintillating fibers. Similar systems are common and familiar to those skilled in the art.

7. Operation of Imaging System Utilizing Cross-talk Adjusted Scintillating Fibers In operation, the gamma ray source in the patient emits positrons which, through annihilation, produce gamma ray pairs which fly off at 180° from one another. Referring to FIG. 1A, fiber stacks 10 and 12 are impacted by gammas 15 and 16 respectively. The gammas striking the fiber generate photons within the scintillating fiber as shown in FIG. 2. By utilizing cross-talk adjusted scintillating fibers according to the present invention, some of the ultraviolet photons generated within the scintillating fiber cross into adjacent fibers producing visible light within the adjacent fibers.

A percentage of these photons produced in the initial fiber and in the adjacent fibers are totally reflected within the individual fiber. In one embodiment, the fibers are directly coupled to position sensitive photomultiplier tubes, therefore, the photomultiplier detects the photons generated in the fiber. The high resolution of the position sensitive photomultipliers coupled to the closely positioned small diameter fibers in the fiber stack enable determination of the spatial position of each fiber detecting a photon. By utilizing cross-talk adjusted scintillating fibers of the present invention, primary events that occur solely within one fiber produce visible light in adjacent fibers as is desirable for systems utilizing angularly displaced fiber layers.

The lower resolution produced by the lighting of multiple fibers depends on the size of the fiber and is significantly better than the 1 mm required in imaging systems. In the case of PET systems there is an intrinsic resolution limit imposed by the distance traveled by the positron before it generates two photons. This resolution limit is considered to be of the order of 1 to 2 mm. In the case of SPECT systems, the resolution is primarily dictated by columnator technology and is larger than 2 mm.

8. Use in SPECT Systems

The present invention is equally applicable in single photon emission computed tomography (SPECT) applications where the detection of photon trajectories is also required. The present invention, in a SPECT environment, enables the substitution of a system utilizing cross-talk optimized scintillating fibers according to the present invention for the traditional SPECT detector system.

In particular, the instrument resulting from this technology will be capable of displaying high spatial resolution, three-dimensional, time-resolved distributions of radionuclide-tagged agents, and will allow acquisition of images at ultra-high resolution in systems utilizing angularly displaced fiber layers.

9. Conclusion

The present invention allows increased efficiency due to cross-talk in PET and SPECT systems utilizing a stack of scintillating fibers with angularly displaced fiber layers. Further modifications and alternative embodiments of the apparatus and method of the present invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently contemplated embodiments. Various changes may be made in the shape, size and arrangement of parts.

For example, equivalent elements or materials may be substituted for those illustrated and described herein, parts may be reversed, and certain features of the invention may be utilized independently of the use of other features, all as would be apparent to one skilled in the art after having the benefit of this description of the invention.

The following listing implements determination method 300. This listing is subject to the notice of copyright at the beginning of this specification. © 1993, Board of Regents, The University of Texas System.

```
/*--------------------- Main Program ---------------------------------*/
/*                                                                    */
/*      Input from keyboard:                                          */
/*              Fiber size - fsize, in millimeters                    */
/*              Attenuation Lenght for uv photons - lambda            */
/*              Ratio of clad to core index of refraction - n12       */
/*              Core index of refraction - ncore                      */
/*              Energy of electron in keV - eenergy                   */
/*              Starting location of track - xs,ys,zs                 */
/*              Direction of track - ttheta,tphi                      */
/*              Number of times to average - numtimes                 */
/*                                                                    */
/*      Output                                                        */
/*              Total number uv photons generated                     */
/*              Number collected in central and neighboring fibers    */
/*              Number collected in top layer - front,middle,back     */
/*              Number collected in center layer - left,center, back  */
/*              Number collected in bottom layer - front,mid,back     */
/*              Number collected in the center layer                  */
/*              Number visible photons trapped in center layer        */
/*              Number collected in top and bottom layers             */
/*              Number visible photons trapped in top/bottom layers   */
/*--------------------------------------------------------------------*/
#include <stdio.h>
#include <math.h>
include <time.h> define TRUE    1
define FALSE   0 static const double DEGTORAD =     0.017453292 ;
static const double PI =           3.141592654 ;
static const double TPI =          6.283185307 ;
static const double PIO2 =         1.570796327 ;
static const double QUANTUM_EFF =  0.028 ;
```

```c
static const double PHOTON_ENERGY =      0.0034 ; /* 3.4 eV in keV */
static double coscrit ; /* cosine of critical angle for reflection */
double fsize ;          /* fiber size */
double fsizeo2 ;        /* fiber radius = fiber size / 2 */
double eenergy ;        /* electron energy */
double xs,ys,zs ;       /* coordinates for start of electron track */
double ttheta,tphi ;    /* electron track direction */
double tracklen ;       /* electron track length */
double lambda,mu ;      /* photon attenuation length */
unsigned long fiber[9] ; /* counts of fibers which contained the conversion */
long total = 0 ;        /* total number of photons */
long totalc ;           /* total number of converted photons */
double fibrdist[5] ;    /* photon distance traveled in a given fiber */
int fibrx[5],fibry[5],fibrz[5] ; /* coordinates of fiber for above distance */
short index ;           /* number of fibers containing photon track */
double efibrdist[5] ;   /* electron distance traveled in a given fiber */
double txstart[5],tystart[5],tzstart[5] ; /* coordinates of fiber */
short eindex ;          /* number of fibers with electron track */ void main(void) ;
double edistnce(double) ;       /* computes distance traveled by electron */
double elec_energy(double) ;    /* computes the energy deposited by electron */
                                /* as function of length along track */
double photon_distance(void) ;  /* distance traveled by a given photon */
short cnvrt_pos(double,double,double,short *,short *,short *,double,double) ;
                                /* coordinate of fiber having photon
                                ** conversion */
short getend(double,double,double,double,double,double d[],int fx[],int fy[],
    int fz[],double) ;          /* returns list of fibers containing photon
                                ** track */
short gettrack(double xs,double ys,double zs,double this,double phis,
    double fibrdist[],double tstartx[],double tstarty[],double tstartz[],
    double tracklen) ;          /* returns list of fibers containing electron
                                ** track */
short getnextxyz(double l,double ttheta,double tphi,double *x,double *y,
    double *z,double *efibrdist,double *txstart,double *tystart,
    double *tzstart,int eindex) ; /* returns coordinates of next set of photons
                                ** generated by electron */

/*---------------------------------------------------------------*/
void main()

{
    double ctphi,stphi,cttheta,sttheta ; /* cos and sin of track angles */
    double trapeff ;                     /* trapping efficiency in fiber */
    double l ;                           /* current distance along electron
                                         ** track where photons are generated */
    double n12 ;                         /* ratio of clad to core index of
                                         ** refraction */
    double ncore ;                       /* index of refraction of core */
    double x,y,z ;                       /* loction of emission of photon */
    double pphi,ptheta ;                 /* direction of emission of photon */
    double energy ;                      /* energy released by electron at this
                                         ** track location */
    double arg ;
    short xp,yp,zp ;                     /* fiber where photon conversion occurs */
    time_t tseed ;                       /* random number generator seed */
    long counter ;                       /* number photons generated */
    short numtimes ;                     /* number of times to average */
    short ntm ;                          /* index over number of times */ time(&tseed) ;
    srand((unsigned int)(tseed & 0xffff)) ; /* seed the random number generator
    printf("Enter fiber size in mm - ") ;
    scanf("%lf",&fsize) ;                /* fiber radius */
    fsizeo2 = fsize/2.0 ;
    printf("Enter fiber attenuation length in mm - ") ;
    scanf("%lf",&lambda) ;
    mu = 1.0/lambda ;
    printf("Enter ratio of clad to core index of refraction (n12<1) - ") ;
    scanf("%lf",&n12) ;
    printf("Enter core index of refraction - ") ;
    scanf("%lf",&ncore) ;
/* the trapping efficiency comes from sscl/physics research note TN #12 */
    trapeff = 0.5*(1.0-n12*n12) ;
```

```
coscrit = sqrt(1.0 - (1.0/ncore)*(1.0/ncore)) ;      /* cosine of critical an
initfbrs(fsizeo2) ;                  /* init photon distance modules */
printf("Enter energy of electron in keV - ") ;
scanf("%lf",&eenergy) ;
tracklen = edistnce(eenergy) ;
printf("Enter x,y,z for start of electron track - ") ;
scanf("%lf %lf %lf",&xs,&ys,&zs) ;
printf("Enter theta,phi for track in degrees - ") ;
scanf("%lf %lf",&ttheta,&tphi) ;
printf("Enter number of times to average - ") ;
scanf("%d",&numtimes) ;
ttheta = DEGTORAD*ttheta ;
tphi = DEGTORAD*tphi ;
counter = 0 ;
inittrk(fsizeo2) ;            /* initialize the track finder */
eindex = gettrack(xs,ys,zs,ttheta,tphi,efibrdist,txstart,tystart,tzstart,
    tracklen) ;               /* get segments of track in the fibers */
for(ntm = 0 ; ntm < numtimes ; ++ntm)
    {
    for(l = 0 ; l < tracklen ; l += 0.05*tracklen)
        { /* take steps of 1/20 of track length */
        if(!getnextxyz(l,ttheta,tphi,&x,&y,&z,efibrdist,txstart,tystart,
            tzstart,eindex)) continue ;   /* get coordinates of next set of
                                          ** photons */
        energy = 0.05*eenergy*QUANTUM_EFF*elec_energy(l) ; /* get energy
                                                          ** deposited */
        ++counter ;
        while(energy > PHOTON_ENERGY)
            {          /* generate photon tracks in randon direction until ener
                ** exhausted */
            ++total ;
            energy -= PHOTON_ENERGY ;
            pphi = TPI*(((double)rand())/32767.0) ; /* random direction */
            arg = -(1.0 - 2.0*(((double)rand())/32767.0)) ; /* this is cos a
            ptheta = acos(arg) ;
/* find conversion position */
            if(!cnvrt_pos(x,y,z,&xp,&yp,&zp,ptheta,pphi)) continue ;
/* log the fiber having the conversion */
            if(yp == 0)
                { /* must be in central layer */
                if(xp == 0)
                    { /* must be the central fiber */
                    ++fiber[4] ;
                    }
                else if(xp < 0)
                    { /* must be the left fiber */
                    ++fiber[3] ;
                    }
                else
                    { /* must be the right fiber */
                    ++fiber[5] ;
                    }
                }
            else if(yp < 0)
                { /* must be in layer below */
                if(zp == 0)
                    { /* center */
                    ++fiber[1] ;
                    }
                else if(zp > 0)
                    { /* front */
                    ++fiber[0] ;
                    }
                else
                    { /* back */
                    ++fiber[2] ;
                    }
                }
            else if(yp > 0)
                { /* must be in layer above */
                if(zp == 0)
                    { /* center */
                    ++fiber[7] ;
                    }
```

```
                    else if(zp > 0)
                        { /* front */
                        ++fiber[6] ;
                        }
                    else
                        { /* back */
                        ++fiber[8] ;
                        }
                    }
                }
            }
        }
    totalc = (fiber[0]+fiber[1]+fiber[2]+fiber[3]+fiber[4]+fiber[5]+
        fiber[6]+fiber[7]+fiber[8])/numtimes ; /* total conversions */
    printf("Total photons - %ld Collected - %ld\n",total/numtimes,totalc) ;
    printf("Top layer - %lu,%lu,%lu\n",fiber[6]/numtimes,fiber[7]/numtimes,
        fiber[8]/numtimes) ;
    printf("Mid layer - %lu,%lu,%lu\n",fiber[3]/numtimes,fiber[4]/numtimes,
        fiber[5]/numtimes) ;
    printf("Bot layer - %lu,%lu,%lu\n",fiber[0]/numtimes,fiber[1]/numtimes,
        fiber[2]/numtimes) ;
    totalc = trapeff*(fiber[3]+fiber[4]+fiber[5])/numtimes ; /* center layer tra
    printf("Center layers - %u\n",(fiber[3]+fiber[4]+fiber[5])/numtimes) ;
    printf("Trapped in center layers - %ld\n",totalc) ;
    printf("Outside layers   %lu\n",(fiber[6]+fiber[7]+fiber[8]+fiber[0]+fiber[1
        fiber[2])/numtimes) ;
    totalc = trapeff*(fiber[6]+fiber[7]+fiber[8]+fiber[0]+fiber[1]+fiber[2])
        /numtimes ;
    printf("Trapped in outside layers - %ld\n",totalc) ;
    }
/*----------------------------------------------------------------------*/
/* this module uses curve fits of the energy dissipation distribution in
** polystyrene - L. V. Spencer Phys. Rev. 98,6,1995.                    */
double elec_energy(double z)

{
    static double int5,int1 ;
    static double xval5[5] = {0.0,0.5,0.77,0.92,1.00} ;
    static double coef5[3][4] = {{1.003699,0.146408,2.785709,1.801173},
                                 {16.280594,-84.388319,160.024311,-96.696973},
                                 {-394.597427,1444.573407,-1737.190791,688.303272
    static double xval1[5] = {0.0,0.42,0.81,0.93,1.00} ;
    static double coef1[3][4] = {{0.99378,0.315961,4.780388,1.061223},
                                 {13.816317,-76.55734,158.043781,-100.814746},
                                 {-766.73092,2774.227713,-3313.393274,1308.507363
    int reg1,reg5,i,j ;
    double tmin  tmin5,tmax1,tmax5,val1,val5,fract ;
    static int first = TRUE ;

if(first)
        {
        first = FALSE ;
        int5 = int1 = 0.0 ;
        for(i = 0 ; i < 3 ; ++i)
            {
            tmin1 = 1.0 ;
            tmin5 = 1.0 ;
            tmax1 = 1.0 ;
            tmax5 = 1.0 ;
            for(j = 0 ; j < 4 ; ++j)
                {
                tmin1 *= xval1[i] ;
                tmax1 *= xval1[i+1] ;
                tmin5 *= xval5[i] ;
                tmax5 *= xval5[i+1] ;
                int1 += coef1[i][j]*(tmax1-tmin1)/(j+1) ;
                int5 += coef5[i][j]*(tmax5-tmin5)/(j+1) ;
                }
            }
        }
    reg1 = reg5 = 0 ;
    z /= tracklen ;
    while(z > xval5[reg5+1]) ++ reg5 ;
    while(z > xval1[reg1+1]) ++ reg1 ;
```

```
    val1 = 0.0 ;
    if(reg1 < 3)
        {
        float x = 1.0 ;
        for(i = 0 ; i < 4 ; ++i)
            {
            val1 += coef1[reg1][i]*x ;
            x *= z ;
            }
        }
    val5 = 0.0 ;
    if(reg5 < 3)
        {
        float x = 1.0 ;
        for(i = 0 ; i < 4 ; ++i)
            {
            val5 += coef5[reg5][i]*x ;
            x *= z ;
            }
        }
    fract = (eenergy-100.0)/400.0 ;
    val1 = (val1 + fract*val5)/(int1 + fract*int5) ;
    return(val1) ;
    }
/*----- returns whether the conversion was in region and fiber coordinate ---*/
short cnvrt_pos(double x,double y,double z,short *pxp,short *pyp,
    short *pzp,double thetap,double phip)
    {
    double distance = photon_distance() ; /* get the random distance traveled
                                          ** by photon with probability distribu
                                          ** of exp(-d/lambda), where lambda is
                                          ** the attenuation length */
    short index,i ;
    static int fibrx[5],fibry[5],fibrz[5] ;
    static double fibrdist[5] ;
    if((index = getend(x,y,z,thetap,phip,fibrdist,fibrx,fibry,fibrz,
        eeenrit)) != 0) /* get the segments of fiber penetration by photon */
        { /* go through segments until distance is exhausted */
        for(i = 0 ; i < index ; ++i)
            {
            if(fibrdist[i] > distance)
                { /* this fiber contains the end of the photon track */
                *pxp = fibrx[i] ;
                *pyp = fibry[i] ;
                *pzp = fibrz[i] ;
                return(TRUE) ;
                }
            else
                { /* subtract away the distance in this fiber */
                distance -= fibrdist[i] ;
                }
            }
        return(FALSE) ;
        }
    else
        {
        return(FALSE) ;
        }
    }
/*-- Generates random distance into detector with exp distribution */
double photon_distance(void)
    {
    double xval ;
    xval = (float)rand()/32767.0 ;
    if(xval < 1e-10) xval = 1e-10 ;
    return(-log(xval)/mu) ;
    }
/*---------- generate the track location of next set of photons ------*/
short getnextxyz(double l,double ttheta,double tphi,double *x,double *y,
    double *z,double *efibrdist,double *txstart,double *tystart,
    double *tzstart,int eindex)

{
    static double ctphi,stphi,cttheta,sttheta,offset ;
    static int curindex ;
    double tmp ;
```

```
        if(l == 0)
            {
            ctphi = cos(tphi) ;
            stphi = sin(tphi) ;
            cttheta = cos(ttheta) ;
            sttheta = sin(ttheta) ;
            curindex = 0 ;
            offset = 0.0 ;
            }
        if(curindex >= eindex) return(FALSE) ; /* outside region of interest */
        tmp = 1 - offset ;
        while(tmp > efibrdist[curindex])
            {
            offset += efibrdist[curindex] ;
            tmp = 1 - offset ;
            ++curindex ;
            if(curindex >= eindex) return(FALSE) ; /* outside region of interest */
            }
        *x = txstart[curindex] + tmp*sttheta*ctphi ;
        *y = tystart[curindex] + tmp*sttheta*stphi ;
        *z = tzstart[curindex] + tmp*cttheta ;
        return(TRUE) ;
        }
/*---------------------------------------------------------------*/
double edistnce(double eenergy)

{
    static double bp = 2.295932 ;
    static double a = 1.32896 ;

double tmp ;

tmp = 0.001*(eenergy) ;               /* energy in MeV */
    tmp = pow(tmp*bp,a) ;                 /* Make units be milimeters */
    tmp *= 0.85 ;                         /* Make it effective electron travel */
    return(tmp) ;
    }
/*------------------------- Photon track distance -----------------------*/
/*    Computes the distance traveled in each fiber by the uv photon */ include <math.h>
include <graphics.h>
include <conio.h> define PI      3.14159265
define PIO2    1.57079633
define PI3O2   4.71238898
#define TRUE    1
define FALSE   0 static double fiberrad,tworad,threerad,fiberrad2 ; /* fiber size variables */
static double yf[2],xf[2] ;                /* coordinates of left/right fibers */
static int ixf[2],iyf[2] ;                 /* same in units of fiber diameter */
static double ytb[2][3],ztb[2][3] ;        /* coordinates of top/bottom fibers */
static int iytb[2][3],iztb[2][3] ;         /* same in units of fiber diameter */ void initfbrs(double fbrrad) ;
double getlength1(double xs,double ys,double sps,double cps) ;
double getlength2(double xs,double ys,double sps,double cps,double xc,double yc)
short getend(double xs,double ys,double zs,double this,double phis,
    double fibrdist[],int fibrx[],int fibry[], int fibrz[],double) ;

/*---------------------------------------------------------------*/
void initfbrs(double fbrrad)

{
    fiberrad = fbrrad ;
    fiberrad2 = fiberrad*fiberrad ;       /* square of the fiber radius */
    yf[0] = yf[1] = 0.0 ;                 /* 0 is right, 1 is left for center */
    iyf[0] = iyf[1] = 0 ;
    ixf[0] = 1 ;
    ixf[1] = -1 ;
    xf[0] = 2.0*fiberrad ;
    xf[1] = - xf[0] ;
    ytb[0][0] = ytb[0][1] = ytb[0][2] = 2.0*fiberrad ; /* 00 - top center,
                                                       ** 01 - top front,
```

```
                                                  ** 02 - top back */
    ytb[1][0] = ytb[1][1] = ytb[1][2] = -2.0*fiberrad ;/* 10 - bottom center,
                                                  ** 11 - bottom front,
                                                  ** 12 - bottom back */
    iytb[0][0] = iytb[0][1] = iytb[0][2] = 1 ;
    iytb[1][0] = iytb[1][1] = iytb[1][2] = -1 ;
    ztb[0][0] = ztb[1][0] = 0.0 ;
    ztb[0][1] = ztb[1][1] = 2.0*fiberrad ;
    ztb[0][2] = ztb[1][2] = -2.0*fiberrad ;
    iztb[0][0] = iztb[1][0] = 0 ;
    iztb[0][1] = iztb[1][1] = 1 ;
    iztb[0][2] = iztb[1][2] = -1 ;
    tworad = 2.0*fiberrad ;
    threerad = 3.0*fiberrad ;
    }
/*--------------------------------------------------------------*/
short getend(double xe,double ye,double ze,double this,double phis,
    double fibrdist[],int fibrx[],int fibry[],int fibrz[],double ccritc)
    {
    double cts,sts,dxy,sps,cps ;
    double abssps,abssts ;
    int fbnum,tbnum,index,i ;
    char skipupdown,skip ;
    int rotate,translatey,translatex,translatez,itmp ;
    double xs,ys,zs,xc,yc ;

translatex = translatey = translatez = rotate = 0 ;
    if((fabs(xe) > threerad) || (fabs(ye) > threerad) || (fabs(ze) > threerad))
        {
        return(0) ;
        }
/* translate and rotate until the origin of photon is in central fiber */
    if(ye > fiberrad)
        {
        translatey = 1 ;
        rotate = 1 ;
        ye -= tworad ;
        }
    else if(ye < -fiberrad)
        {
        translatey = -1 ;
        rotate = 1 ;
        ye += tworad ;
        }
    if(xe > fiberrad)
        {
        translatex = 1 ;
        xe -= tworad ;
        }
    else if(xe < -fiberrad)
        {
        translatex = -1 ;
        xe += tworad ;
        }
    if(ze > fiberrad)
        {
        translatez = 1 ;
        ze -= tworad ;
        }
    else if(ze < -fiberrad)
        {
        translatez = -1 ;
        ze += tworad ;
        }
    if(rotate)
        {
        xs = -ze ;
        ys = ye ;
        zs = xe ;
        }
    else
        {
        xs = xe ;
        ys = ye ;
        zs = ze ;
```

```
                }
            index = 0 ;
            sts = sin(this) ;
            cts = cos(this) ;
            sps = sin(phis) ;
            cps = cos(phis) ;
            abssts = fabs(sts) ;
            abssps = fabs(sps) ;
            dxy = getlength1(xs,ys,sps,cps) ;
            skip = FALSE ;
            if(dxy > fiberrad/100)
                { /* if here there is some photon track in the central fiber */
                fibrx[index] = 0 ;
                fibry[index] = 0 ;
                fibrz[index] = 100 ;
                if(abssts < 1e-2)
                    { /* if here theta is so small that all of photon track in central
                    ** fiber */
                    fibrdist[index++] = 100 ;
                    skip = TRUE ;
                    }
                else
                    {
                    double tx,ty,tz,tmp1,tmp2,creflect ;
                    /* first check for internal reflection */
                    tx = dxy*cps ;
                    ty = dxy*sps ;
                    tz = dxy*cts/sts ;
                    xc = xs + tx ; /* find the contact point with edge of fiber */
                    yc = ys + ty ;
                    tmp1 = -xc*tx - yc*ty ;
                    tmp2 = sqrt(xc*xc+yc*yc).*sqrt(tx*tx+ty*ty+tz*tz) ;
                    creflect = fabs(tmp1/tmp2) ;
                    if(creflect <= ccritc)
                        { /* we have internal reflection all is in central fiber */
                        fibrdist[index++] = 100 ;
                        skip = TRUE ;
                        }
                    else
                        {
                        fibrdist[index++] = dxy/abssts ;
                        }
                    }
                }
            if(!skip)
                {
                if((phis <= PIO2) || (phis >= PI3O2))
                    { /* if here going to right */
                    fbnum = 0 ;
                    }
                else
                    {
                    fbnum = 1 ;
                    }
                skipupdown = 0 ;
                dxy = getlength2(xs,ys,sps,cps,xf[fbnum],yf[fbnum]) ; /* get dist in fib
                if(dxy > fiberrad/100)
                    { /* if here we have some track in the fiber */
                    fibrx[index] = ixf[fbnum] ;
                    fibry[index] = iyf[fbnum] ;
                    fibrz[index] = 100 ;
                    fibrdist[index++] = dxy/abssts ;
                    if((phis == 0.0) || (phis == PI))
                        {
                        skipupdown = 1 ;
                        }
/* test if slope is so small that it does not reach upper/lower fiber before
** moving outside of the region of interest - compute the y distance which
** corresponds to the crossing with the upper fiber layer */
                    else
                        {
                        double tmp1 ;
                        if(phis <= PI)
                            { /* going up - figure the vertical distance */
                            tmp1 = fiberrad - ys ;
```

```
                }
            else
                { /* going down - fibure the vertical distance */
                tmp1 = fiberrad + ys ;
                }
            tmp1 /= fabs(tan(phis)) ; /* convert to horizontal distance */
/* three fiber radii is beyond the region of interest - if going to right
** subtract the x coordinate to compute max x distance else add */
            if(tmp1 > (3*fiberrad - xs*(1-2*fbnum)))
                {
                skipupdown = 1 ;
                }
            else skipupdown = 0 ;
            }
        if(!skipupdown && (abssps > 1e-6))
            { /* could be some in top/bottom layers */
            fbnum = 0 ;
            if(phis <= PI)
                { /* if here top layer */
                tbnum = 0 ;
                }
            else
                { /* if here bottom layer */
                sts = - sts ; /* theta should range from -pi to pi */
                tbnum = 1 ;
                }
            dxy = getlength2(zs,ys,sts,cts,ztb[tbnum][fbnum],
                ytb[tbnum][fbnum]) ; /* length in central fiber */
            if(dxy > fiberrad/100)
                { /* if here we have a track in central top/bottom fiber */
                fibrx[index] = 100 ;
                fibry[index] = iytb[tbnum][fbnum] ;
                fibrz[index] = iztb[tbnum][fbnum] ;
                fibrdist[index++] = dxy/abssps ;
                }
            if((this <= PIO2) || (this >= PI3O2))
                { /* if here it is front fiber */
                fbnum = 1 ;
                }
            else
                { /* if here it is back fiber */
                fbnum = 2 ;
                }
            dxy = getlength2(zs,ys,sts,cts,ztb[tbnum][fbnum],
                ytb[tbnum][fbnum]) ; /* distance in the fiber */
            if(dxy > fiberrad/100)
                { /* if here we have some distance */
                fibrx[index] = 100 ;
                fibry[index] = iytb[tbnum][fbnum] ;
                fibrz[index] = iztb[tbnum][fbnum] ;
                fibrdist[index++] = dxy/abssps ;
                }
            }
        }
/* perform inverse rotation/translation back to original coordinate if needed */
    for(i = 0 ; i < index ; ++i)
        {
        if(rotate)
            {
            itmp = fibrx[i] ;
            fibrx[i] = fibrz[i] ;
            fibrz[i] = -itmp ;
            }
        if(translatex)
            {
            fibrx[i] += translatex ;
            }
        if(translatey)
            {
            fibry[i] += translatey ;
            }
        if(translatez)
            {
            fibrz[i] += translatez ;
```

```c
        }
    return(index) ;
    }
/*-----------------------------------------------------------------*/
double getlength1(double xs,double ys,double sps,double cps)
    {
    double d1,d2,lo2 ;

d1 = -ys*sps - xs*cps ; /* distance from xs,ys to normal to track line from
                            ** origin */
    d2 = fabs(-xs*sps+ys*cps) ; /* distance from origin to intersection of track
                                ** line with normal from origin */
    lo2 = sqrt(fiberrad2 - d2*d2) ; /* 1/2 track length within fiber */
    return(lo2 + d1) ;
    }
/*-----------------------------------------------------------------*/
double getlength2(double xs,double ys,double sps,double cps,double xc,double yc)
    {
    double d2 ;

d2 = fabs(-(xs-xc)*sps+(ys-yc)*cps) ; /* distance from origin to intersectio
                                          ** of track line with normal from
                                          ** origin */
    if(d2 > fiberrad) return(0.0) ;       /* no track in this fiber */
    return(2.0*sqrt(fiberrad2 - d2*d2)) ; /* track length within fiber */
    }
    #include <math.h>
#include <graphics.h>
include <conio.h> define PI      3.14159265
define PIO2    1.57079633
define PI3O2   4.71238898 static double fiberrad,tworad,threerad ;        /* fiber size variables */
static double yf[2],xf[2] ;                     /* coordinates of left/right fibers */
static double ytb[2][3],ztb[2][3] ;             /* coordinates of top/bottom fibers */ void inittrk(double fbrrad) ;
double getlength1(double xs,double ys,double sps,double cps) ;
double getlength2(double xs,double ys,double sps,double cps,double xc,double yc)
short gettrack(double xs,double ys,double zs,double this,double phis,
    double fibrdist[],double tstartx[],double tstarty[],double tstartz[],
    double tracklen) ;

/*-----------------------------------------------------------------*/
void inittrk(double fbrrad)

{
    fiberrad = fbrrad ;
    yf[0] = yf[1] = 0.0 ;                       /* 0 - right, 1 is left for center */
    xf[0] = 2.0*fiberrad ;
    xf[1] = - xf[0] ;
    ytb[0][0] = ytb[0][1] = ytb[0][2] = 2.0*fiberrad ; /* 00 - top center,
                                                      ** 01 - top front,
                                                      ** 02 - top back */
    ytb[1][0] = ytb[1][1] = ytb[1][2] = -2.0*fiberrad ;/* 10 - bottom center,
                                                      ** 11 - bottom front,
                                                      ** 12 - bottom back */
    ztb[0][0] = ztb[1][0] = 0.0 ;
    ztb[0][1] = ztb[1][1] = 2.0*fiberrad ;
    ztb[0][2] = ztb[1][2] = -2.0*fiberrad ;
    tworad = 2.0*fiberrad ;
    threerad = 3.0*fiberrad ;
    }
/*-----------------------------------------------------------------*/
short gettrack(double xs,double ys,double zs,double this,double phis,
    double fibrdist[],double tstartx[],double tstarty[],double tstartz[],
    double tracklen)
    {
    double cts,sts,dxy,sps,cps ;
    double abssps,asssts ;
    int fbnum,tbnum,index,i ;
    double d2,xq,yq,zq,rstart,tmp1 ;
```

```
    index = 0 ;
    sts = sin(this) ;
    cts   cos(this) ;
    sps = sin(phis) ;
    cps = cos(phis) ;
    abssts = fabs(sts) ;
    abscps = fabs(cps) ;
    dxy = getlength1(xs,ys,sps,cps) ;
    if(dxy > fiberrad/100)
        { /* if here there is some electron track in the central fiber */
        tstartx[index] = xs ;
        tstarty[index] = ys ;
        tstartz[index] = zs ;
        if(abssts < 1e-2)
            { /* test if theta small and it goes down central fiber */
            fibrdist[index++] = 100 ;
            return(index) ;
            }
        else
            {
            fibrdist[index] = dxy/abssts ;
            if(fibrdist[index] >= tracklen)
                {
                return(++index) ;
                }
            tracklen -= fibrdist[index++] ;
            }
        }
    if((phis <= PIO2) || (phis >= PI3O2))
        { /* if here going to right */
        fbnum = 0 ;
        }
    else
        { /* if here going to left */
        fbnum = 1 ;
        }
    dxy = getlength2(xs,ys,sps,cps,xf[fbnum],yf[fbnum]) ;
    if(dxy > fiberrad/100)
        { /* if here we have some track in left/right fiber */
        d2 = -(xs-xf[fbnum])*sps+(ys-yf[fbnum])*cps ;
        xq = xf[fbnum] - d2*sps ;
        yq = yf[fbnum] + d2*cps ;
        tstartx[index] = xq - dxy*cps/2.0 ;
        tstarty[index] = yq - dxy*sps/2.0 ;
        rstart = tstartx[index]/(sts*cps) ;
        tstartz[index] = rstart*cts ;
        fibrdist[index] = dxy/abssts ;
        if(fibrdist[index] >= tracklen)
            {
            return(++index) ;
            }
        tracklen -= fibrdist[index++] ;
        if((phis == 0.0) || (phis == PI))
            {
            return(index) ; ;
            }
/* test if slope is so small that it does not reach upper/lower fiber before
** moving outside of the region of interest - compute the x distance which
** corresponds to the crossing with the upper fiber layer */
        else
            {
            if(phis <= PI)
                { /* going up - figure the vertical distance */
                tmp1 = fiberrad - ys ;
                }
            else
                { /* going down - fibure the vertical distance */
                tmp1 = fiberrad + ys ;
                }
            tmp1 /= fabs(tan(phis)) ; /* convert to horizontal distance */
/* three fiber radii is beyond the region of interest - if going to right
** subtract the x coordinate to compute max x distance else add */
            if(tmp1 > (3*fiberrad - xs*(1-2*fbnum)))
                {
```

```
            return(index) ;
            }
        }
    }
if(absssps > 1e-6)
    { /* if here we are going up or down */
    fbnum = 0 ;
    if(phis <= PI)
        { /* going up */
        tbnum = 0 ;
        }
    else
        { /* going down */
        sts = - sts ; /* theta should go from -pi to pi */
        tbnum = 1 ;
        }
    dxy = getlength2(zs,ys,sts,cts,ztb[tbnum][fbnum],
        ytb[tbnum][fbnum]) ;
    if(dxy > fiberrad/100)
        { /* if here we have track in center top/bottom fiber */
        d2 = -(zs-ztb[tbnum][fbnum])*sts+(ys-ytb[tbnum][fbnum])*cts ;
        zq = ztb[tbnum][fbnum] - d2*sts ;
        yq = ytb[tbnum][fbnum] + d2*cts ;
        tstartz[index] = zq - dxy*cts/2.0 ;
        tstarty[index] = yq - dxy*sts/2.0 ;
        rstart = tstartz[index]/cts ;
        tstartx[index] = rstart*sts*cps ;
        fibrdist[index++] = dxy/abssps ;
        if(fibrdist[index] >= tracklen)
            {
            return(++index) ;
            }
        tracklen -= fibrdist[index++] ;
        }
    if((this <= PIO2) || (this >= PI3O2))
        { /* if here front fiber */
        fbnum = 1 ;
        }
    else
        { /* if here back fiber */
        fbnum = 2 ;
        }
    dxy = getlength2(zs,ys,sts,cts,ztb[tbnum][fbnum],
        ytb[tbnum][fbnum]) ;
    if(dxy > fiberrad/100)
        { /* if here we have some top/bottom , front/back track */
        d2 = -(zs-ztb[tbnum][fbnum])*sts+(ys-ytb[tbnum][fbnum])*cts ;
        zq = ztb[tbnum][fbnum] - d2*sts ;
        yq = ytb[tbnum][fbnum] + d2*cts ;
        tstartz[index] = zq - dxy*cts/2.0 ;
        tstarty[index] = yq - dxy*sts/2.0 ;
        rstart = tstartz[index]/cts ;
        tstartx[index] = rstart*sts*cps ;
        fibrdist[index++] = dxy/abssps ;
        }
    }
return(index) ;
```

What is claimed is:

1. A method for determining a level of cross-talk between at least two scintillating fibers comprising:
   selecting secondary attenuation lengths corresponding to secondary dye concentrations within said at least two scintillating fibers;
   simulating interaction of an energized particle with said at least two scintillating fibers to produce photons, said interaction originating within one of said at least two scintillating fibers; and
   determining a level of cross-talk between said at least two scintillating fibers by calculating an average number of visible light photons produced within said at least two scintillating fibers for said selected secondary attenuation lengths.

2. The method of claim 1, wherein said at least two scintillating fibers have the same secondary attenuation length, said selecting step comprising:
   selecting a single secondary attenuation length corresponding to a secondary dye concentration within said at least two scintillating fibers.

3. The method of claim 2, further comprising:
   repeating said selecting, simulating, and determining steps to produce a plurality of cross-talk levels for a corresponding plurality of selected secondary attenuation lengths; and
   selecting a desired secondary attenuation length corresponding to a desired level of cross-talk from said plurality of cross-talk levels.

4. The method of claim 3, wherein said step of selecting a desired secondary attenuation length comprises selecting an optimal secondary attenuation length corresponding to an optimal level of cross-talk.

5. The method of claim 3, wherein said at least two scintillating fibers comprise a plurality of scintillating fibers disposed in a plurality of layers, said plurality of layers being one fiber thick, and said plurality of layers being angularly displaced and substantially parallel with respect to each other, said determining step comprising:
determining a level of cross-talk between said plurality of scintillating fibers by calculating an average number of visible light photons produced within said plurality of layers for said selected secondary attenuation length.

6. The method of claim 5, wherein said plurality of layers are displaced at a 90 degree angle with respect to each other, said determining step comprising:
determining a level of cross-talk between a primary scintillating fiber and eight of said plurality of scintillating fibers adjacent said primary scintillating fiber by calculating an average number of visible light photons produced within said primary scintillating fiber and said eight adjacent scintillating fibers for said selected secondary attenuation length.

7. An apparatus for determining a level of cross-talk between scintillating fibers comprising:
an input device for receiving secondary attenuation lengths corresponding to secondary dye concentrations within said scintillating fibers;
a memory device coupled to said input device for storing said secondary attenuation lengths;
a central processing unit coupled to said memory and coupled to said input device for determining a level of cross-talk between said scintillating fibers by calculating an average number of visible light photons produced within said scintillating fibers due to simulated interaction of an energized particle with said fibers, said interaction originating within one of said scintillating fibers; and
an output device coupled to said central processing unit for displaying said average number of visible light photons produced for said secondary attenuation lengths.

8. The apparatus of claim 7, wherein said scintillating fibers have the same secondary attenuation length.

9. The apparatus of claim 8, wherein:
said central processing unit also determines a plurality of levels of cross-talk for a plurality of secondary attenuation lengths and selects a desired secondary attenuation length corresponding to a desired level of cross-talk from said plurality of cross-talk levels.

10. The apparatus of claim 9, wherein said desired secondary attenuation length selected corresponds to an optimal level of cross-talk.

11. An apparatus for locating sources of gamma rays within a patient in a medical diagnostic imaging system to produce an image of the patient, comprising:
a plurality of cross-talk adjusted scintillating fibers, positioned to receive gamma rays from gamma sources within a patient to be imaged, comprising at least one stack, each stack comprising:
a plurality of layers of said plurality of cross-talk adjusted scintillating fibers,
each of said plurality of layers including a plurality of cross-talk adjusted scintillating fibers positioned substantially parallel and immediate each adjacent fiber within the same layer,
each of said plurality of layers being one fiber diameter in depth, and being positioned parallel with each adjacent layer, and
each of said plurality of layers being positioned at an angle to each adjacent layer; and
a plurality of position sensitive photomultipliers coupled to said plurality of cross-talk adjusted scintillating fibers.

12. The apparatus of claim 11, wherein:
said angle of each of said plurality of layers to each adjacent layer is 90 degrees.

13. The apparatus of claim 11, further comprising:
means for collecting and processing data from said position sensitive photomultipliers to determine locations of said sources of said gamma rays, and to produce an image of said patient based upon said locations.

14. The apparatus of claim 13, wherein said collecting and processing data means, comprises:
an output from each of said position sensitive photomultipliers connected to an input of a fast analog-to-digital converter, and
an output from said analog-to-digital converter being connected to at least one processor, said processor enabling storage and display of a form of said output.

15. The apparatus of claim 13, wherein:
said collecting and processing data means enables determination of a spatial coordinate of an origin position of a detected gamma ray.

16. A method for locating sources of gamma rays within a patient in a medical diagnostic imaging system to produce an image of the patient, comprising:
providing a plurality of cross-talk adjusted scintillating fibers;
arranging said plurality of cross-talk adjusted scintillating fibers in a plurality of layers;
positioning a portion of said plurality of cross-talk adjusted scintillating fibers substantially parallel and lengthwise each other in each said layer;
further positioning each said layer parallel each adjacent said layer in a fiber stack, fibers in each said layer being at an angle with respect to fibers in each adjacent layer;
coupling a plurality of position sensitive photomultipliers to said plurality of scintillating fibers;
configuring said plurality of said fiber stacks proximate a patient having gamma ray sources; and
collecting and processing data output from said position sensitive photomultipliers to determine locations of said gamma ray sources, and to produce an image of said patient from said locations.

17. The method of claim 16, said further positioning step comprising:
positioning fibers in each said layer at a 90 degree angle with respect to fibers in each adjacent layer.

18. The method of 16, said collecting and processing step comprising:
connecting an output from said position sensitive photomultiplier to an input of a fast analog-to-digital converter, and
connecting an output of said analog-to-digital converter to at least one processor, said process or enabling storage and display of a forms of said output.

* * * * *